US008705557B2

(12) United States Patent
Richardson et al.

(10) Patent No.: US 8,705,557 B2
(45) Date of Patent: Apr. 22, 2014

(54) METHODS AND APPARATUS FOR SUPPORTING MULTICAST COMMUNICATIONS

(75) Inventors: Thomas J. Richardson, South Orange, NJ (US); Xinzhou Wu, Monmouth Junction, NJ (US); Shailesh Patil, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 13/177,870

(22) Filed: Jul. 7, 2011

(65) Prior Publication Data

US 2013/0010603 A1     Jan. 10, 2013

(51) Int. Cl.
*H04W 24/00*     (2009.01)
*H04W 74/08*     (2009.01)
*H04W 72/00*     (2009.01)

(52) U.S. Cl.
CPC ........ *H04W 74/0875* (2013.01); *H04W 72/005* (2013.01)
USPC ...................................................... 370/432

(58) Field of Classification Search
USPC ......... 370/241, 312, 314, 321, 322, 329, 330, 370/345, 347, 348, 350, 432, 436, 442, 443, 370/444, 458, 459, 461, 462
See application file for complete search history.

(56) References Cited

U.S. PATENT DOCUMENTS

| 6,628,646 | B1 | 9/2003 | Angle et al. |
| 6,781,986 | B1* | 8/2004 | Sabaa et al. .................... 370/389 |
| 7,184,413 | B2* | 2/2007 | Beyer et al. .................... 370/254 |
| 7,961,698 | B2 | 6/2011 | Wu et al. |
| 2007/0104151 | A1 | 5/2007 | Papasakellariou et al. |
| 2007/0285512 | A1 | 12/2007 | Kitani et al. |
| 2008/0130483 | A1* | 6/2008 | Khandekar et al. ........... 370/208 |
| 2009/0016229 | A1* | 1/2009 | Wu et al. ....................... 370/252 |
| 2009/0016317 | A1* | 1/2009 | Wu et al. ....................... 370/347 |
| 2010/0246442 | A1* | 9/2010 | Wang et al. .................... 370/254 |

FOREIGN PATENT DOCUMENTS

WO    WO 2010027215 A2    3/2010

OTHER PUBLICATIONS

International Search Report and Written Opinion—PCT/US2012/045464—ISA/EPO—Oct. 24, 2012.
Bianco, A. et al., "Scheduling Algorithms for Multicast Traffic in TDM/WDM Networks with Arbitrary Tuning Latencies", Global Telecommunications Conference 2001, Globecom '01, IEEE, vol. 3, pp. 1551-1556.

* cited by examiner

*Primary Examiner* — Mark Rinehart
*Assistant Examiner* — Kenneth P Hunt
(74) *Attorney, Agent, or Firm* — James K. O'Hare

(57) ABSTRACT

Methods and apparatus for supporting multicast groups in networks, e.g., wireless peer to peer networks, are described. A member of a multicast group, that does not intend to transmit in a traffic interval, generates and transmits a signal on a traffic transmission request resource indicating that the device transmitting the signal does not intend to transmit multicast traffic data to the multicast group. A member of the multicast group, that intends to transmit in the traffic interval, refrains from transmitting a signal and monitors. The devices in the group which did not transmit decide which one is allowed to proceed with its intended multicast traffic transmission based on relative priority within the group.

20 Claims, 32 Drawing Sheets

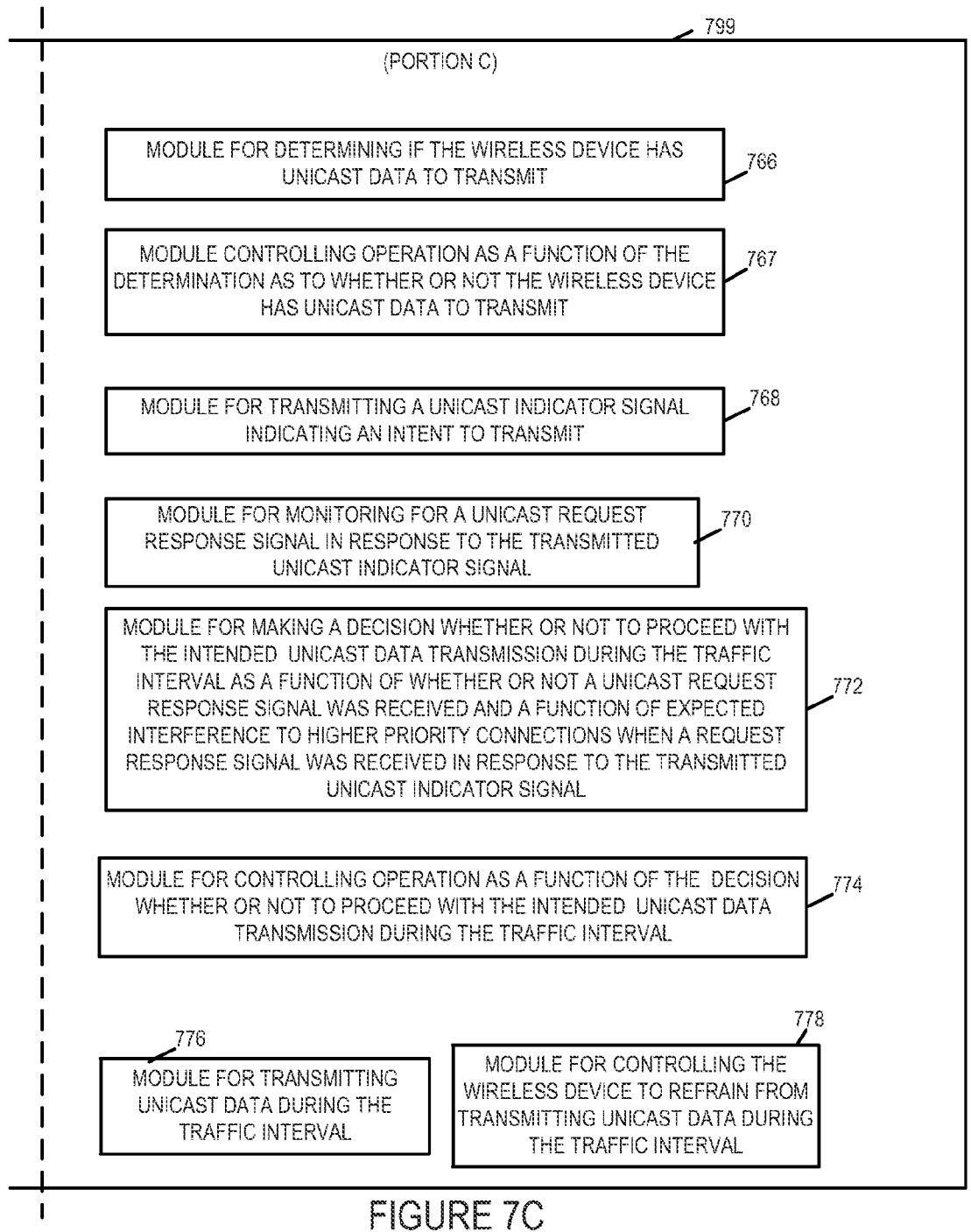

METHODS AND APPARATUS FOR SUPPORTING MULTICAST COMMUNICATIONS

FIELD

Various embodiments are directed to traffic scheduling, and more particularly to efficiently scheduling multicast group traffic, e.g., in a peer to peer network.

BACKGROUND

In networks, e.g., peer to peer or other networks, there may be situations where one device may desire to transmit the same information to multiple devices in its local vicinity. In such situations, it would be more efficient if the one device could transmit a multicast traffic signal which could be received by the multiple devices rather than repeating the same signal over multiple unicast peer to peer connections. One simple approach to implementing multicast is to allocate connection scheduling resources to each of the possible peer to peer connection alternatives that is possible in a multicast group, and then make a single multicast traffic transmission after scheduling has been resolved. However, this approach results in a high usage of connection scheduling resources for situations in which a multicast group includes a large number of members or in which there may be a large number of different multicast groups competing for traffic transmission opportunities. In addition, at different times, there may be different balances between peer to peer connections which would like to transmit unicast traffic and multicast groups which would like to transmit multicast traffic.

In view of the above, it would be beneficial if new more efficient and/or more flexible methods and apparatus for multicast connection scheduling were developed

SUMMARY

Methods and apparatus for supporting multicast groups in wireless networks, e.g., peer to peer networks, are described. Various described methods and apparatus are well suited for embodiments in which traffic scheduling is implemented to support both unicast peer to peer connection traffic and multicast group traffic. In some such embodiments, the traffic scheduling is performed in a decentralized distributed manner. In various embodiments, available traffic scheduling resources may be self allocated to either peer to peer connections or multicast group members. In various embodiments, scheduling priority, e.g., both scheduling priority with regard to different peer to peer connections and/or different multicast groups in competition for a traffic segment and scheduling priority within regard to the different members of a multicast group competing within the group for a multicast traffic transmission opportunity may, and in some embodiments is, associated with the position of allocated resources in a resource block used for scheduling. While the multicast related methods and apparatus of the invention are well suited for use in systems which support both multicast and unicast, they may be used in systems where multicast communication does not compete with unicast communication for traffic resources.

In some embodiments, a peer to peer connection is allocated a set of resources of a first size, e.g., three OFDM tone-symbols, to be used for scheduling peer to peer unicast traffic in a traffic interval. In some such embodiments, a member of a multicast group is allocated a set of resources of the first size, e.g., three OFDM tone-symbols, to be used for scheduling multicast group traffic in a traffic interval. Note that this approach of allocating traffic scheduling resources on a peer connection basis for peer to peer connections and on a per device basis for multicast groups provides for a more efficient use of scheduling resources than would be the case if sets of resources were allocated to each of the possible peer to peer connections in a multicast group of a large size.

In some, but not necessarily all embodiments, at least some of the allocated traffic transmission request resources are used for different purposes depending upon whether the at least some allocated traffic transmission request resource is being used for a peer to peer connection between two peer devices or for a multicast group member. In one embodiment, a signal communicated in a resource of a first traffic transmission request block corresponding to a peer to peer connection carries a signal indicating that the device transmitting the signal intends to transmit unicast peer to peer traffic, while a signal communicated in a resource of the first traffic transmission request block corresponding to a member of a multicast group carries a signal indicating that the device transmitting the signal does not intend to transmit multicast traffic data to the multicast group. In some such embodiments, resources in a second traffic transmission request block convey signals indicating an intent to transmit for both unicast and multicast scenarios. In some such embodiments, resources in a traffic transmission request response block carry request responses from intended receiver devices for both unicast and multicast scenarios.

Various exemplary methods and apparatus are well suited for the mixture of unicast and multicast. In some embodiments, unicast connections compete with multicast groups for the right to transmit in traffic intervals, e.g., based on priority. Various methods and apparatus facilitate distributed receiver yielding and transmitter yielding determinations even when multicast is mixed with unicast.

An exemplary method of operating a wireless device which is a member of a multicast group, in accordance with some embodiments, comprises: monitoring for signals from other members of a multicast group indicating an intent not to transmit during a first traffic interval and making a transmission decision with regard to said first traffic interval based on a priority level of said wireless device relative to other members of said multicast group, from which a signal indicating an intent not to transmit was not received.

An exemplary wireless device which is a member of a multicast group, in accordance with some embodiments, comprises at least one processor configured to: monitor for signals from other members of a multicast group indicating an intent not to transmit during a first traffic interval; and make a transmission decision with regard to said first traffic interval based on a priority level of said wireless device relative to other members of said multicast group, from which a signal indicating an intent not to transmit was not received. The exemplary wireless device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 7C is drawing of a third portion of assembly of modules which can, and in some embodiments is, used in the exemplary wireless device illustrated in FIG. 6.

DETAILED DESCRIPTION

Figure 1:
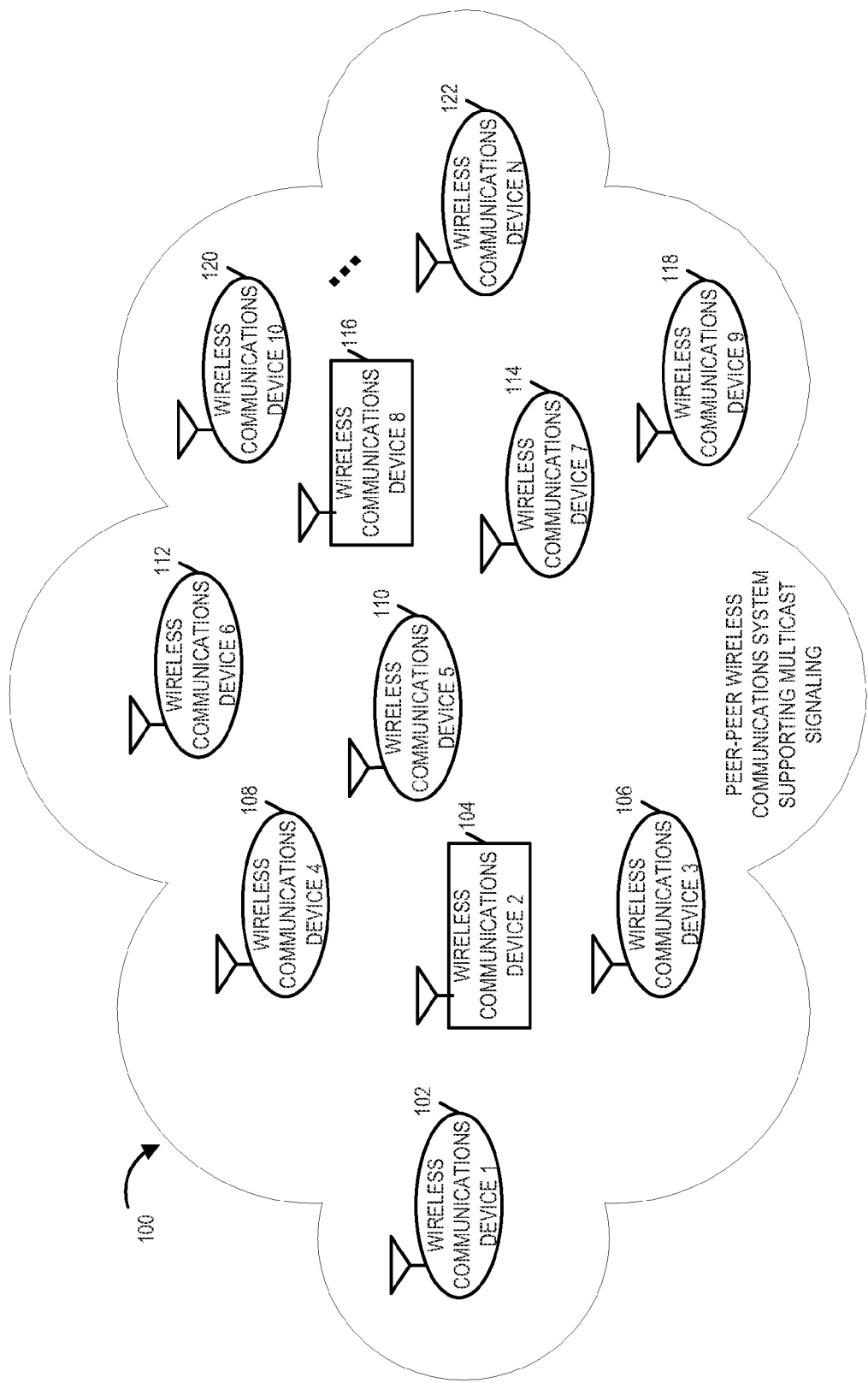
FIG. 1 is a drawing of an exemplary peer to peer wireless communications system supporting multicast signaling in accordance with various exemplary embodiments.

FIG. 1 is a drawing of an exemplary peer to peer wireless communications system 100 in accordance with various exemplary embodiments. Exemplary peer to peer wireless communications system 100 includes a plurality of wireless communications devices (wireless communications device 1 102, wireless communications device 2 104, wireless communications device 3 106, wireless communications device 4 108, wireless communications device 5 110, wireless communications device 6 112, wireless communications device 7 114, wireless communications device 8 116, wireless communications device 9 118, wireless communications device 10 120, . . . , wireless communications device N 122) which support a peer to peer signaling protocol. The peer to peer signaling protocol supports both unicast signaling in which one wireless device transmits a unicast traffic signal directed to another wireless device which with it has a peer to peer connection and multicast signaling in which a member of a group transmits a multicast traffic signal to other members of its multicast group. Exemplary wireless communications devices (102, 106, 108, 110, 112, 114, 118, 120, 122) are mobile devices while wireless communications devices (104, 116) are stationary devices. Wireless communications devices in system 100 may be, and sometimes are, members of one or more multicast groups. In various embodiments, at different times there may be different members in a multicast group.

In various embodiments, scheduling for traffic intervals is performed in a decentralized distributed manner by the wireless devices. Various traffic scheduling signals corresponding to a unicast traffic transmission include: a request to transmit traffic signal, and a request response signal. Various traffic scheduling signals corresponding a multicast traffic transmission include: a signal including an intent not to transmit multicast traffic, a request to transmit multicast traffic signal, and a request response signal.

Figure 2:
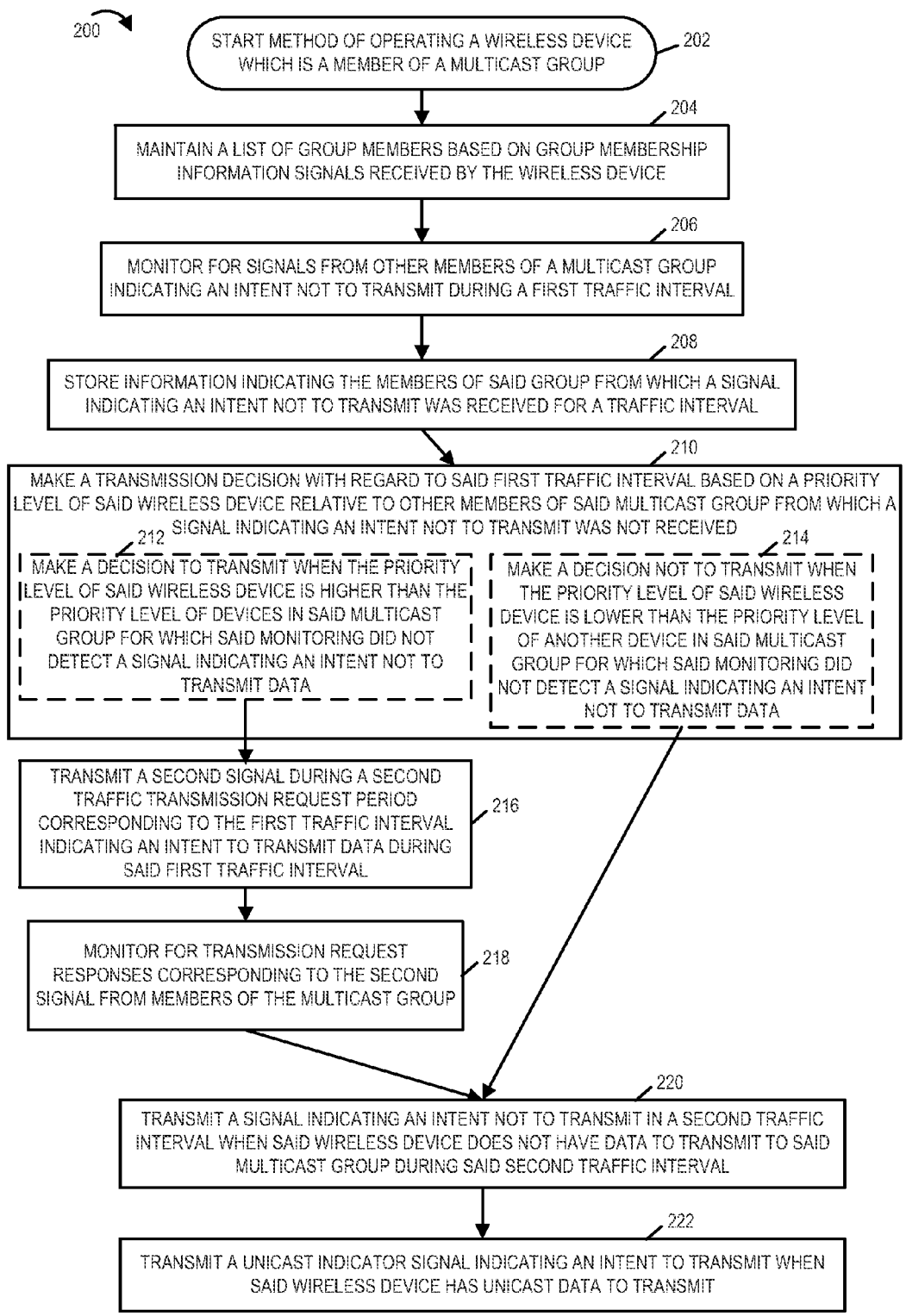
FIG. 2 is a flowchart of an exemplary method of operating a wireless device in accordance with various embodiments.

FIG. 2 is a flowchart 200 of an exemplary method of operating a wireless device which is a member of a multicast group in accordance with various embodiments. Operation of the exemplary method starts in step 202, where the wireless device is powered on and initialized and proceeds from start step 202 to step 204. In step 204 the wireless device maintains a list of group members based on group membership information signals received by the wireless device. Operation proceeds from step 204 to step 206. In step 206 the wireless device monitors for signals from other members of a multicast group indicating an intent not to transmit during a first traffic interval. In some such embodiments, the monitoring is performed during a first traffic request period corresponding to the first traffic interval. Operation proceeds from step 206 to step 208. In step 208 the wireless device stores information indicating the members of said group from which a signal indicating an intent not to transmit was received for a traffic interval, e.g., for the first traffic interval. Operation proceeds from step 208 to step 210.

In step 210 the wireless device makes a transmission decision with regard to said first traffic interval based on a priority level of said wireless device relative to other members of said multicast group from which a signal indicating an intent not to transmit was not received. Step 210 includes step 212 and step 214 which are alternative steps. In step 212 the wireless device makes a decision to transmit when the priority level of said wireless device is higher than the priority level of devices in said multicast group for which said monitoring did not detect a signal indicating an intent not to transmit. Operation proceeds from step 212 to step 216.

Returning to step 214, in step 214 the wireless device makes a decision not to transmit when the priority level of said wireless device is lower than the priority level of another device in said multicast group for which said monitoring did not detect a signal indicating an intent not to transmit data. Operation proceeds from step 214 to step 220.

Returning to step 216, in step 216 the wireless device transmits a second signal during a second traffic transmission request period corresponding to the first traffic interval indicating an intent to transmit data during said first traffic interval. Then, in step 218 the wireless device monitors for transmission request responses corresponding to the second signal from members of the multicast group. In various embodiments, there is a predetermined known relationship between the transmission resource used to transmit the second signal and transmission resources which may be used to transmit said responses. Operation proceeds from step 218 to step 220.

In step 220 the wireless device transmits a signal indicating an intent not to transmit in a second traffic transmission interval when said wireless device does not have data to transmit to said multicast group during said second traffic interval. Operation proceeds from step 220 to step 222. In step 222, the wireless device transmits a unicast indicator signal indicating an intent to transmit when said wireless device has unicast data to transmit, e.g., during a third traffic interval.

Figure 3:
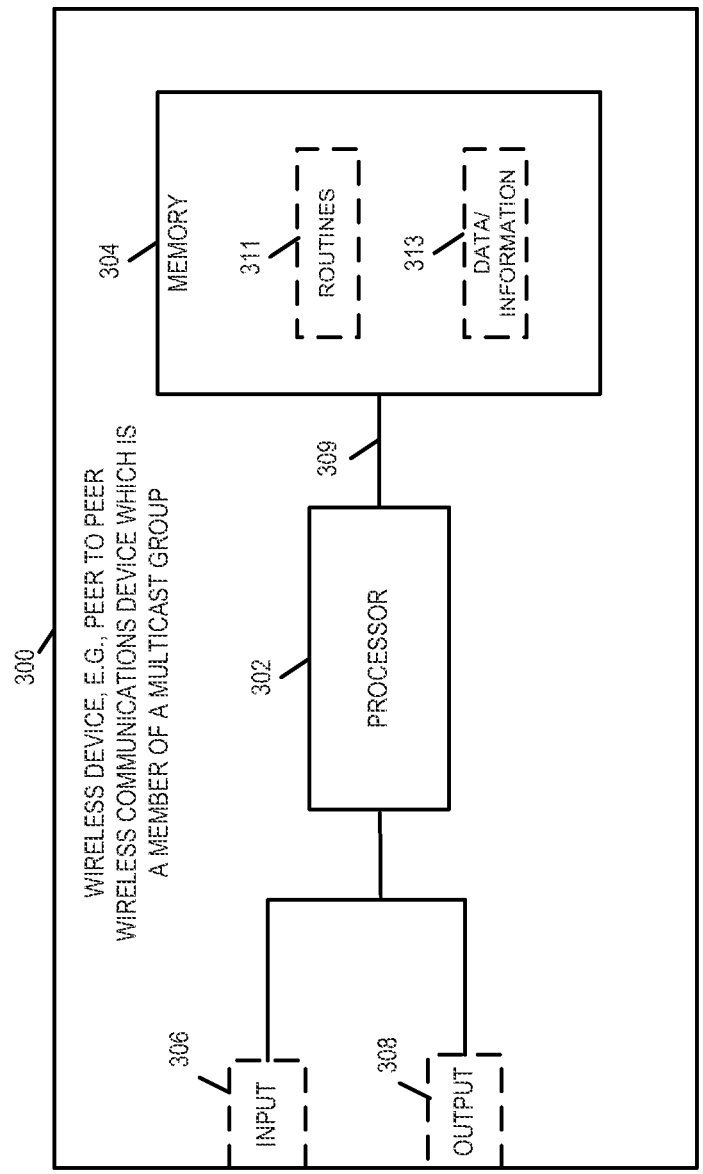
FIG. 3 is a drawing of an exemplary wireless device in accordance with an exemplary embodiment.

FIG. 3 is a drawing of an exemplary wireless device 300 in accordance with an exemplary embodiment. Exemplary wireless device 300 is, e.g., one of the wireless communications devices of system 100 of FIG. 1. Wireless device 300 is, e.g., a wireless communications device which supports a peer to peer signaling protocol and which is a member of a multicast group. Exemplary wireless device 300 may, and sometimes does, implement a method in accordance with flowchart 200 of FIG. 2.

Wireless device 300 includes a processor 302 and memory 304 coupled together via a bus 309 over which the various elements (302, 304) may interchange data and information. Wireless device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In various embodiments, processor 302 is configured to: monitor for signals from other members of a multicast group indicating an intent not to transmit during a first traffic interval; and make a transmission decision with regard to said first traffic interval based on a priority level of said wireless device relative to other members of said multicast group, from which a signal indicating an intent not to transmit was not received. In some such embodiments, processor 302 is configured to: perform said monitoring during a first traffic request period corresponding to the first traffic interval; and to transmit a second signal during a second traffic request period corresponding to the first traffic interval indicating an intent to transmit data during said first traffic interval, when said transmission decision is a decision to transmit. In various embodiments, processor 302 is further configured to: monitor for transmission request responses corresponding to said second signal from members of the multicast group. In some such embodiments, there is a predetermined known relationship between the transmission resource used to transmit said second signal and transmission resources which may be used to transmit said responses. Processor 302, in some embodiments, is configured to make a decision to transmit when the priority level of said wireless device is higher than the priority level of devices in said multicast group for which said monitoring did not detect a signal indicating an intent not to transmit, as part of being configured to make a transmission decision. In some embodiments, processor 302 is configured to make a decision not to transmit when the priority level of said wireless device is lower than the priority level of another device in said multicast group for which said monitoring did not detect a signal indicating an intent not to transmit, as part of being configured to make a transmission decision.

In various embodiments, processor 302 is further configured to transmit a signal indicating an intent not to transmit in a second traffic interval when said wireless device does not have data to transmit to said multicast group during said second traffic interval. In some embodiments, processor 302 is further configured to: maintain a list of group members based on group membership information signals received by said wireless device; and store information indicating the members of said group from which a signal indicating an intent not to transmit was received, for a traffic interval.

In various embodiments, processor 302 is further configured to: transmit a unicast indicator signal indicating an intent to transmit, when said wireless device has unicast traffic to transmit.

Figure 4:
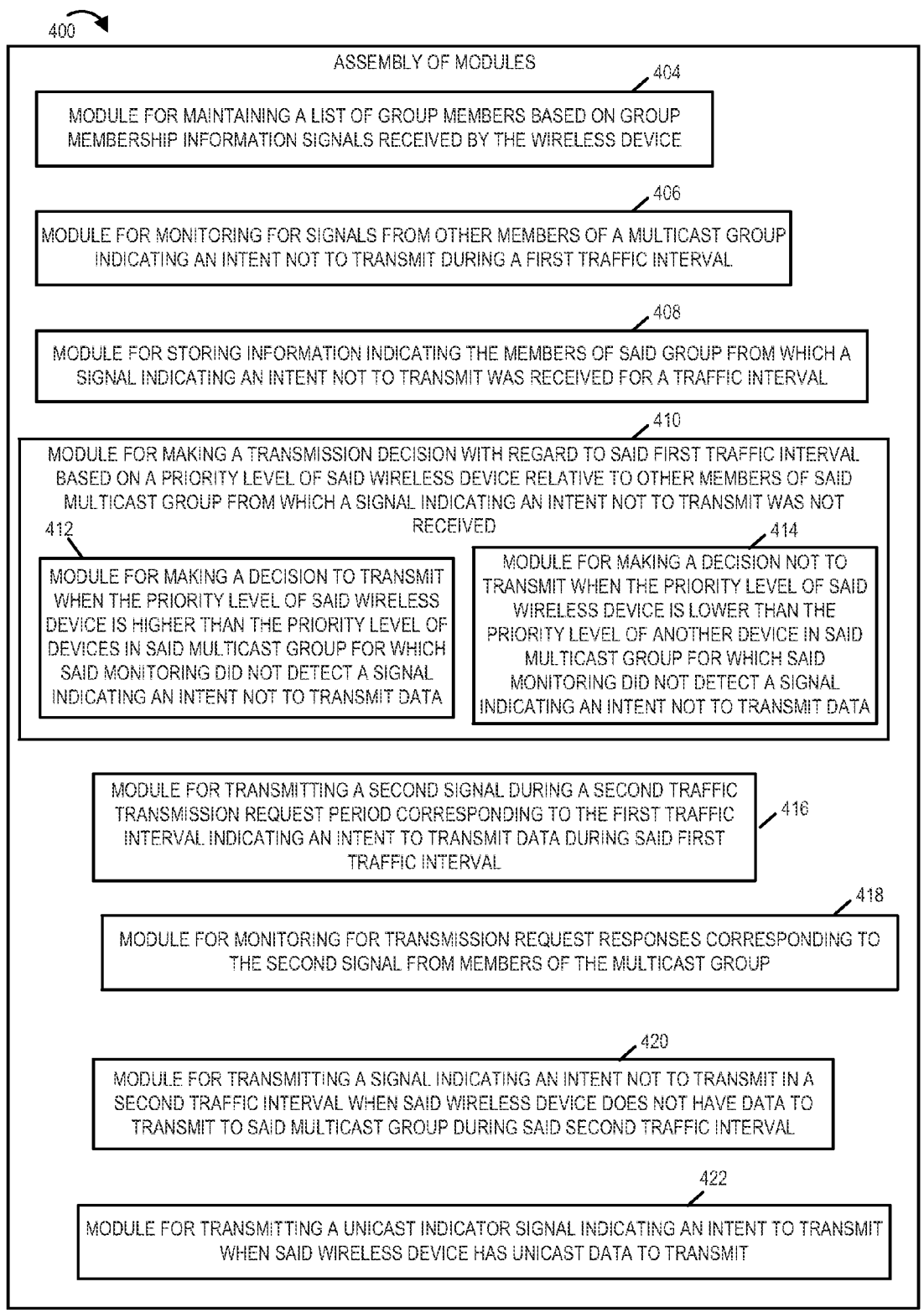
FIG. 4 is drawing of an assembly of modules which can, and in some embodiments is, used in the exemplary wireless device illustrated in FIG. 3.

FIG. 4 is an assembly of modules 400 which can, and in some embodiments is, used in the exemplary wireless device 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless device 300 or elements therein such as the processor 302, to perform the functions of the corresponding steps illustrated and/or described in the method of flowchart 200 of FIG. 2.

Assembly of modules 400 includes a module 404 for maintaining a list of group members based on group membership information signals received by the wireless terminal, a module 406 for monitoring for signals from other members of a multicast group from which a signal indicating an intent not to transmit was received for a traffic interval, a module 408 for storing information indicating the members of said group from which a signal indicating an intent not to transmit was received for a traffic interval, and a module 410 for making a transmission decision with regard to said first traffic interval based on a priority level of said wireless device relative to other members of said multicast group from which a signal indicating an intent not to transmit was not received. In some embodiments, the monitoring of module 406 is performed during a first traffic transmission request period corresponding to the first traffic interval.

Module 410 includes a module 412 for making a decision to transmit when the priority level of said wireless device is higher than the priority level devices in said multicast group for which said monitoring did not detect a signal indicating an intent to transmit data and a module 414 for making a decision not to transmit when the priority level of said wireless device is lower than the priority level of another device in said multicast group for which said monitoring did not detect a signal indicating an intent not to transmit data.

Assembly of modules 400 further includes a module 416 for transmitting a second signal during a second traffic transmission request period corresponding to the first traffic interval indicating an intent to transmit data during said first traffic interval when said transmission decision is decision to transmit, and a module 418 for monitoring for transmission request responses corresponding to the second signal from members of the multicast group. In various embodiments, there is a predetermined known relationship between the transmission resource used to transmit the second signal and transmission resources which may be used to transmit said responses.

Assembly of modules 400 further includes a module 420 for transmitting a signal indicating an intent not to transmit in a second traffic interval when said wireless device does not have data to transmit to said multicast group during said second traffic interval, and a module 422 for transmitting a unicast indicator signal indicating an intent to transmit when said wireless device has unicast data to transmit.

Figure 5A:
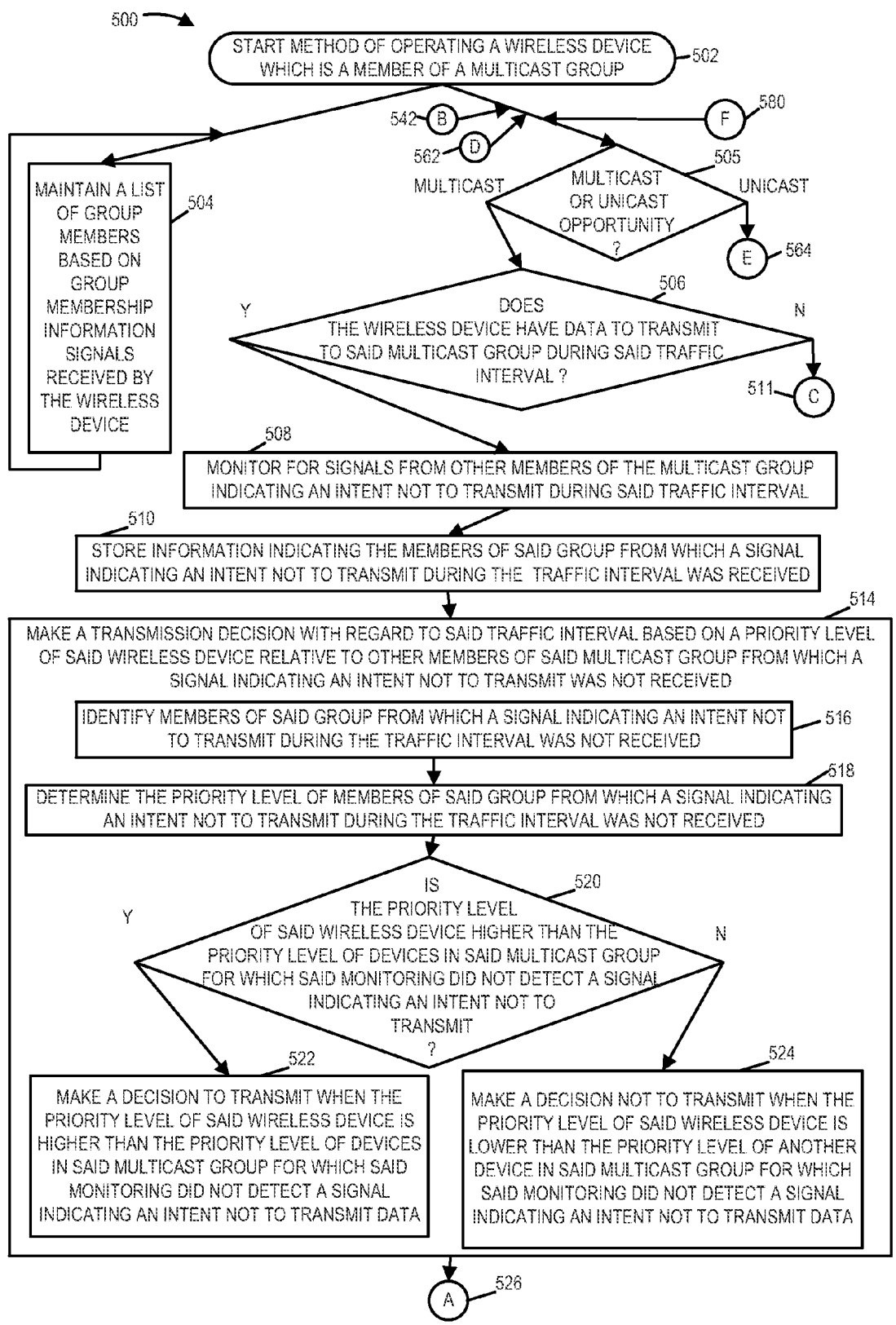
FIG. 5A is a first part of flowchart of an exemplary method of operating a wireless device in accordance with various embodiments.
Figure 5B:
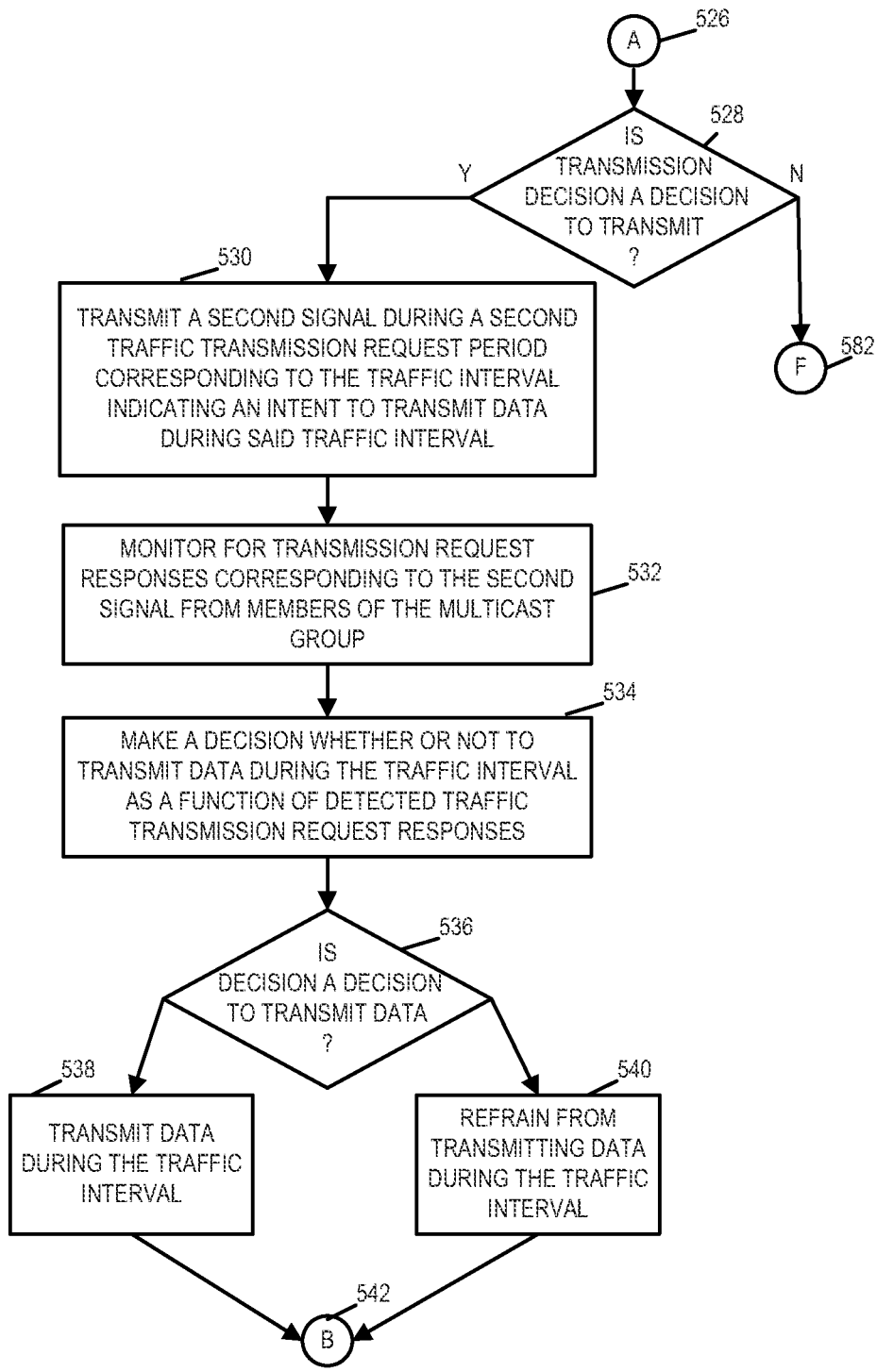
FIG. 5B is a second part of flowchart of an exemplary method of operating a wireless device in accordance with various embodiments.
Figure 5C:
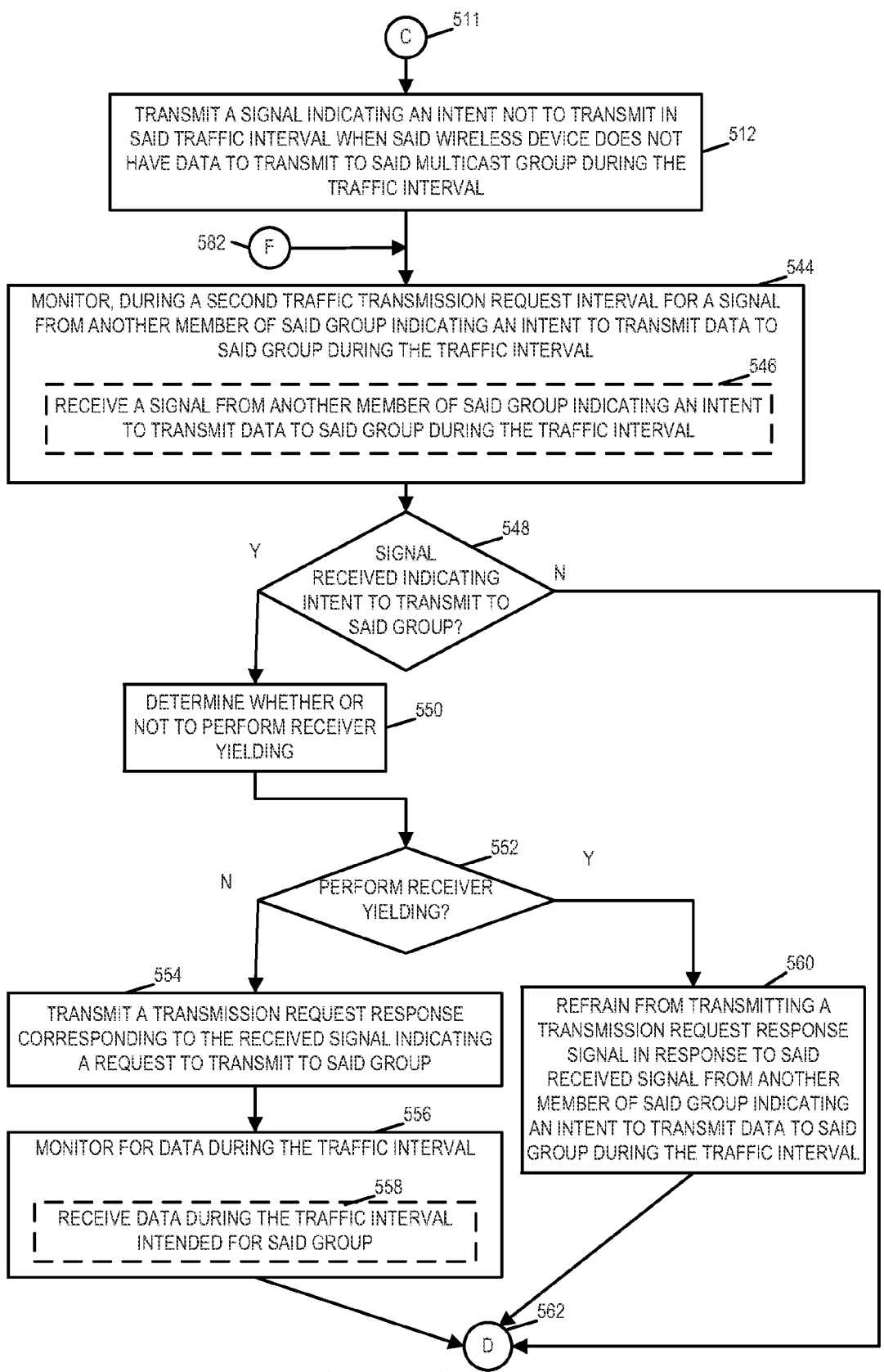
FIG. 5C is a third part of flowchart of an exemplary method of operating a wireless device in accordance with various embodiments.
Figures 5, 5A, 5B, 5C, 5D:
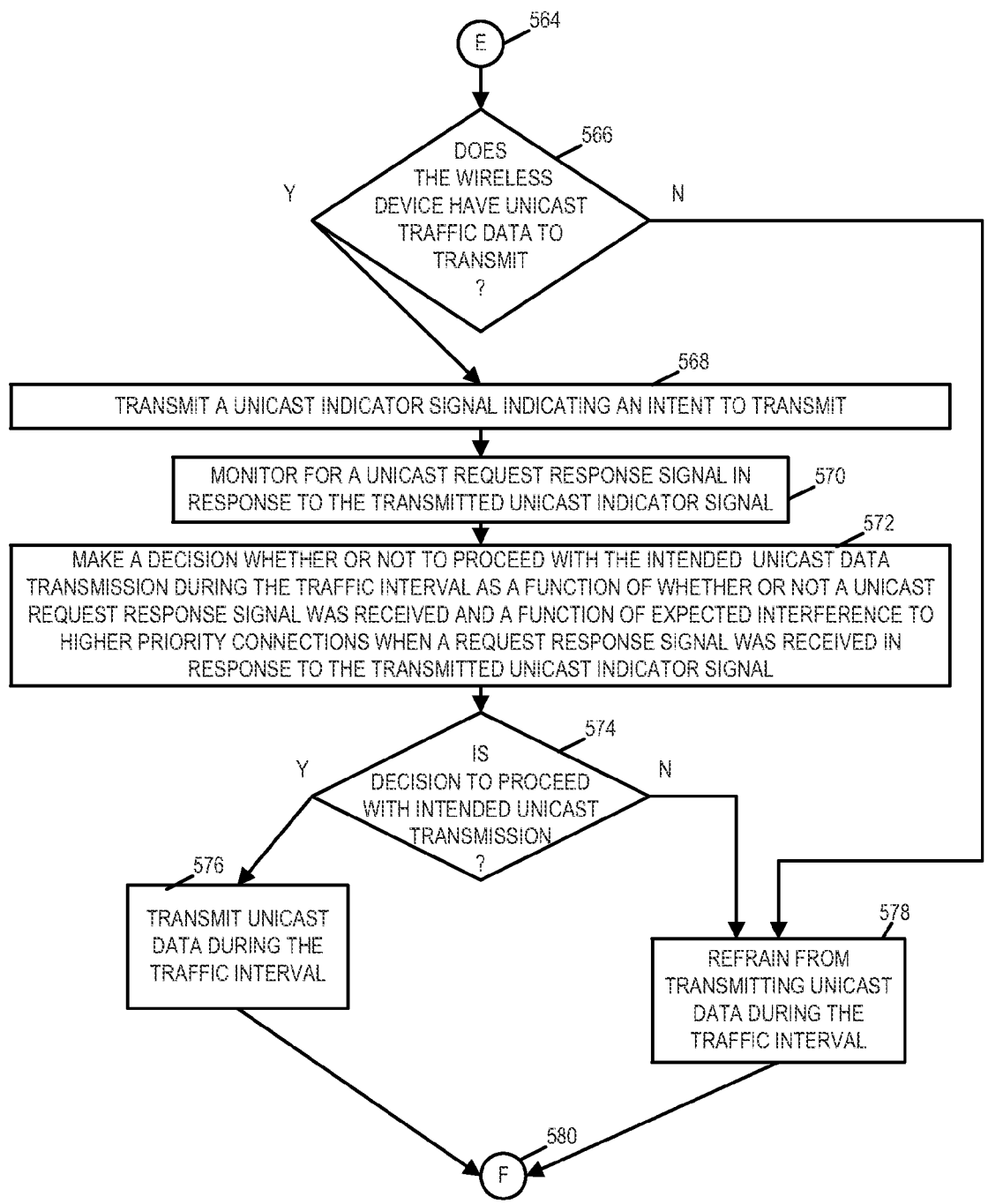
FIG. 5D is a fourth part of flowchart of an exemplary method of operating a wireless device in accordance with various embodiments.

FIG. 5, comprising the combination of FIG. 5A, FIG. 5B, FIGS. 5C and 5D, is a flowchart 500 of an exemplary method of operating a wireless device which is a member of a multicast group in accordance with an exemplary embodiment. The exemplary wireless device is, e.g., one of the wireless devices of system 100 of FIG. 1. Operation of the exemplary method starts in step 502, where the wireless device is powered on and initialized. Operation proceeds from start step 502 to step 504 and step 505. In step 504, which is performed on an ongoing basis, the wireless device maintains a list of group members based on group membership information received by the wireless device.

Returning to step 505, in step 505 the wireless device determines if it has a multicast communications opportunity or a unicast communications opportunity for a traffic interval under consideration. If the wireless device determines that it has a unicast opportunity, then operation proceeds from step 505 via connecting node E 564 to step 566. However, if the wireless device determines that it has a multicast opportunity, then operation proceeds from step 505 to step 506. In step 506 if the wireless device determines that the wireless device has data to transmit to the multicast group, then operation proceeds from step 506 to step 508; otherwise operation proceeds from step 506, via connecting node C 511, to step 512. Returning to step 508, in step 508, the wireless device monitors for signals from other members of the multicast group indicating an intent not to transmit during said traffic interval. Operation proceeds from step 508 to step 510, in which the wireless device stores information indicating the members of said group from which a signal indicating an intent not transmit during the traffic interval was received. Operation proceeds from step 510 to step 514.

In step 514 the wireless device makes a transmission decision with regard to said traffic interval based on a priority level of said wireless device relative to other members of said multicast group from which a signal indicating an intent not to transmit was not received. Step 514 includes steps 516, 518, 520, 522 and 524. In step 516 the wireless device identifies members of said group from which a signal indicating an intent not to transmit during the traffic interval was not received. For example, the identified members of said group in step 516 is determined from taking the list of group members of step 504 and then removing the members stored in step 510. Operation proceeds from step 516 to step 518. In step 518 the wireless device determines the priority level of members of said group from which a signal indicating an intent not to transmit during the traffic interval was not received. Operation proceeds from step 518 to step 520.

In step 520 the wireless device determines if the priority level of the wireless device is higher than the priority level of devices in said multicast group for which said monitoring did not detect a signal indicating an intent not to transmit. If the priority level of the wireless device is higher than the priority level of devices in said multicast group for which said monitoring did not detect a signal indicating an intent not to transmit, then operation proceeds from step 520 to step 522; otherwise operation proceeds from step 520 to step 524. Returning to step 522, in step 522 the wireless device makes a decision to transmit when the priority level of said wireless device is higher than the priority level of devices in said multicast group for which said monitoring did not detect a signal indicating an intent not to transmit data. Returning to step 524, in step 524, the wireless device makes a decision not to transmit when the priority level of said wireless device is lower than the priority level of another device in said multicast group for which said monitoring did not detect a signal indicating an intent not to transmit data.

Operation proceeds from step 514 via connecting node A 526 to step 528. If the decision of step 514 is a decision to transmit, then operation proceeds from step 528 to step 530; otherwise, operation proceeds from step 528 to step 544, via connecting node F 582. Returning to step 530, in step 530, the wireless device transmits a second signal during a second traffic transmission request period corresponding to the traffic transmission interval indicating an intent to transmit data during said traffic interval. Operation proceeds from step 530 to step 532.

In step 532 the wireless device monitors for transmission request responses corresponding to the second signal from members of the multicast group. In various embodiments, there is a predetermined known relationship between the transmission resource used to transmit the second signal of step 530 and the resources which may be used to transmit the responses received in step 532. Then, in step 534 the wireless device makes a decision whether or not to transmit data during the traffic interval as a function of detected traffic transmission request responses.

In various embodiments, step 534 includes performing interference considerations from a reception perspective and a transmission perspective. For example, one or more of the intended group member recipients may have decided that the reception quality would be too low, e.g., below a predetermined signal quality threshold and may have decided to perform receiver yielding and did not send back a request response signal. As another example, the wireless device may have determined that if it proceeds with the multicast transmission to its group it may cause an unacceptable level of interference to reception of a signal corresponding to another connection or another group having a higher priority and thus decides to perform transmitter yielding and not transmit. In some embodiments, for wireless device to proceed with transmitting data at least one of the intended recipients in its group has transmitted a request response indicating that it is ok to proceed and the wireless device has decided not to perform transmitter yielding. In some embodiments, for the wireless device to proceed with transmitting data each of the intended recipients in its group has transmitted a request response indicating that it is ok to proceed and the wireless device has decided not to perform transmitter yielding. In some embodiments, for the wireless device to proceed with transmitting data each of the intended recipients in its group has transmitted a request response indicating that it is ok to proceed and the wireless device has decided not to perform transmitter yielding. In some embodiments, for the wireless device to proceed with transmitting data at least a predetermined number or predetermined percentage of the intended recipients in its group has transmitted a request response indicating that it is ok to proceed and the wireless device has decided not to perform transmitter yielding. In some embodiments, the power of received request responses of other connections and/or other groups is measured and used in the interference estimation that the wireless device will cause to other links or groups if it should proceeds with the transmission.

Operation proceeds from step 534 to step 536. In step 536 if the decision of step 534 is to transmit data then operation proceeds from step 536 to step 538; otherwise operation proceeds from step 536 to step 540. In step 538, the wireless device transmit data to the multicast group during the traffic interval. Alternatively, in step 540 the wireless device refrains from transmitting data to the multicast group during the traffic interval. Operation proceeds from step 538 or step 540, via connecting node B 542, to step 506 for consideration of another traffic interval.

Returning to step 512, in step 512 the wireless device transmits a signal indicating an intent not to transmit in said traffic interval when said wireless device does not have data to transmit to said multicast group during the traffic interval. Operation proceeds from step 512 to step 544. In step 544 the wireless device monitors during a second traffic transmission request interval for a signal from another member of said group indicating an intent to transmit data to said group during the traffic interval. Step 544, may, and sometimes does, include step 546 in which the wireless device receives a signal from another member of said group indicating an intent to transmit data to said group during the traffic interval. Operation proceeds from step 544 to step 548.

In step 548, if the wireless device has received a signal indicating an intent to transmit to the group in the monitoring of step 544, then operation proceeds from step 548 to step 550; otherwise, operation proceeds from step 548 to step 505 via connecting node D 562. Returning to step 550, in step 550 the wireless device determines or not determines whether or not to perform receiver yielding. In various embodiments, the determination of step 550 is performed as a function of an estimated received signal quality at the wireless device if the requested multicast traffic signal should proceed in view of other anticipated concurrent transmissions using the same air link resources. For example estimated received SINR is compared to a predetermined threshold and it is decided not to perform receiver yielding if the estimated received signal quality is above the predetermined threshold. If the wireless device has decided to perform receiver yielding, then operation proceeds from step 552 to step 560, where the wireless device refrains from transmitting a transmission request response signal in response to said received signal from another member of said group indicating an intent to transmit data to said group during the traffic interval. Operation proceeds from step 560 via connecting node D 562 to step 505 for consideration of another traffic interval.

Returning to step 552, if the wireless device has decided not to perform receiver yielding, then operation proceeds from step 552 to step 554, in which the wireless device transmits a transmission request response corresponding to the received signal indicating a request to transmit to said group. Operation proceeds from step 554 to step 556. In step 556 the wireless device monitors for data during the traffic interval. Step 556 may, and sometimes does include step 558 in which the wireless device receives data during the traffic interval intended for the group. Operation proceeds from step 556 via connecting node D 562 to step 505 for consideration of another traffic interval.

Returning to step 566, in step 566, the wireless device determines whether or not the wireless device has unicast traffic data to transmit during the traffic interval. If the wireless device has unicast data to transmit, then operation proceeds from step 566 to step 568; otherwise, operation proceeds from step 566 to step 578; where the wireless device refrains from transmitting unicast data during the traffic interval.

Returning to step 568, in step 568, the wireless device transmits a unicast indicator signal indicating an intent to transmit. Operation proceeds from step 568 to step 570. In step 570 the wireless device monitors for a unicast request response signal in response to the transmitted unicast indicator signal. Operation proceeds from step 570 to step 572. In step 572, the wireless device makes a decision whether or not to proceed with the intended unicst data transmission during the traffic interval as a function of whether or not a unicast traffic transmission request response signal was received and as a function of expected interference to higher priority connections when a request response signal was received in response to the transmitted unicast indicator signal. Operation proceeds from step 572 to step 574.

In step 574, if the decision of step 572 is to proceed with the intended unicast transmission, then operation proceeds from step 574 to step 576 in which the wireless device transmits unicast data during the traffic interval. However, if the decision of step 572 was not to proceed with the intended unicast transmission, then operation proceeds from step 574 to step 578 where the wireless device refrains from transmitting unicast data during the traffic interval. Operation proceeds from step 576 or step 578, via connecting node F 580, to step 505, where another traffic interval is considered.

In one example, during a first iteration of the flowchart corresponding to a first traffic interval, operation proceeds via step 505, step 506, step 508, step 510, step 514 including steps 516, 518, 520, and 522, step 528, step 530, step 532, step 534, step 536, and step 538, resulting in the transmission of multicast traffic data by the wireless device during the first traffic interval. Continuing with the example, during a second iteration of the flowchart corresponding to a second traffic interval, operation proceeds via steps step 505, step 506, step 508, step 510, step 514 including steps 516, 518, 520, and 524, step 528, step 544 including step 546, step 548, step 550, step 552, step 554, and step 556 including step 558, resulting the recovery of multicast data during the second traffic interval from another member of said multicast group which has a higher priority than the priority of the wireless device. Continuing with the example, during a third iteration of the flowchart corresponding to a third traffic interval, operation proceeds via steps step 505, step 506, step 512, step 544 including step 546, step 548, step 550, step 552, step 554, and step 556 including step 558, resulting in the reception and recovery of multicast data from another member of said group during the third traffic interval. Continuing with the example, during a fourth iteration of the flowchart corresponding to a fourth traffic interval, operation proceeds via step 505, 566, 568, 570, 572, 574, and 576, resulting in transmission of unicast traffic data during the fourth traffic interval by the wireless device.

Figure 6:
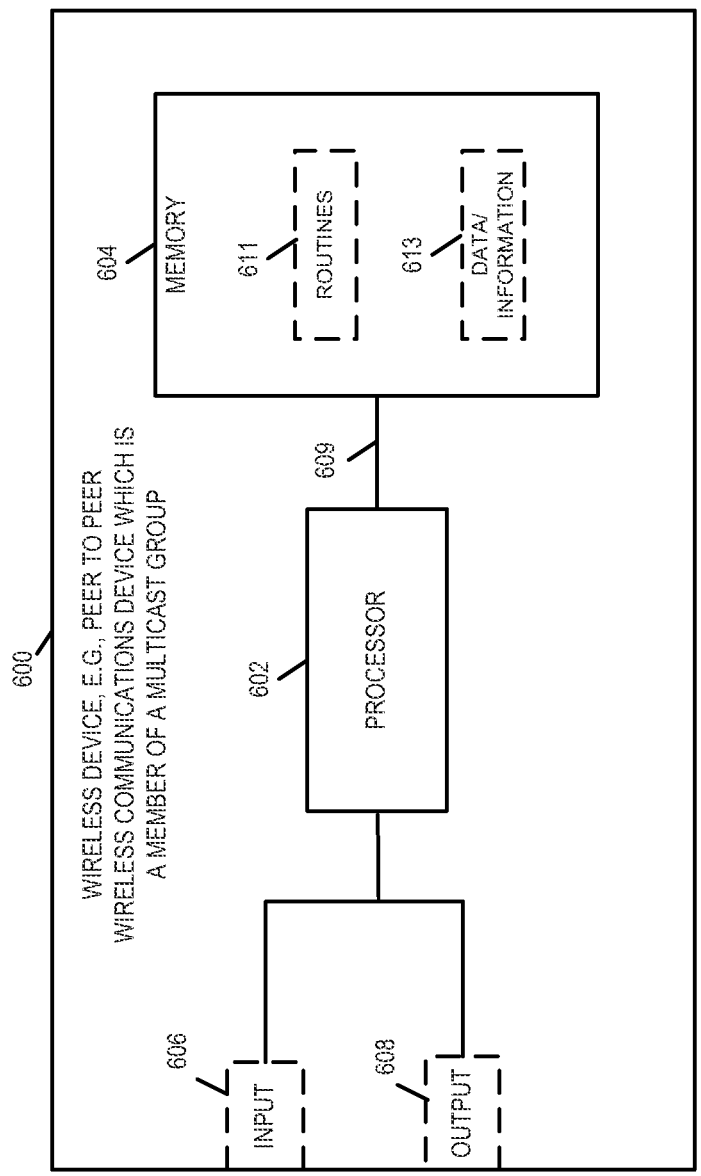
FIG. 6 is a drawing of an exemplary wireless device in accordance with an exemplary embodiment.

FIG. 6 is a drawing of an exemplary wireless device 600 in accordance with an exemplary embodiment. Exemplary wireless device 600 is, e.g., one of the wireless communications devices of system 100 of FIG. 1. Wireless device 600 is, e.g., a wireless communications device which supports a peer to peer signaling protocol and which is a member of a multicast group. Exemplary wireless device 600 may, and sometimes does, implement a method in accordance with flowchart 500 of FIG. 5.

Wireless device 600 includes a processor 602 and memory 604 coupled together via a bus 609 over which the various elements (602, 604) may interchange data and information. Wireless device 600 further includes an input module 606 and an output module 608 which may be coupled to processor 602 as shown. However, in some embodiments, the input module 606 and output module 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output. In some embodiments, memory 604 includes routines 611 and data/information 613.

Figure 7A:
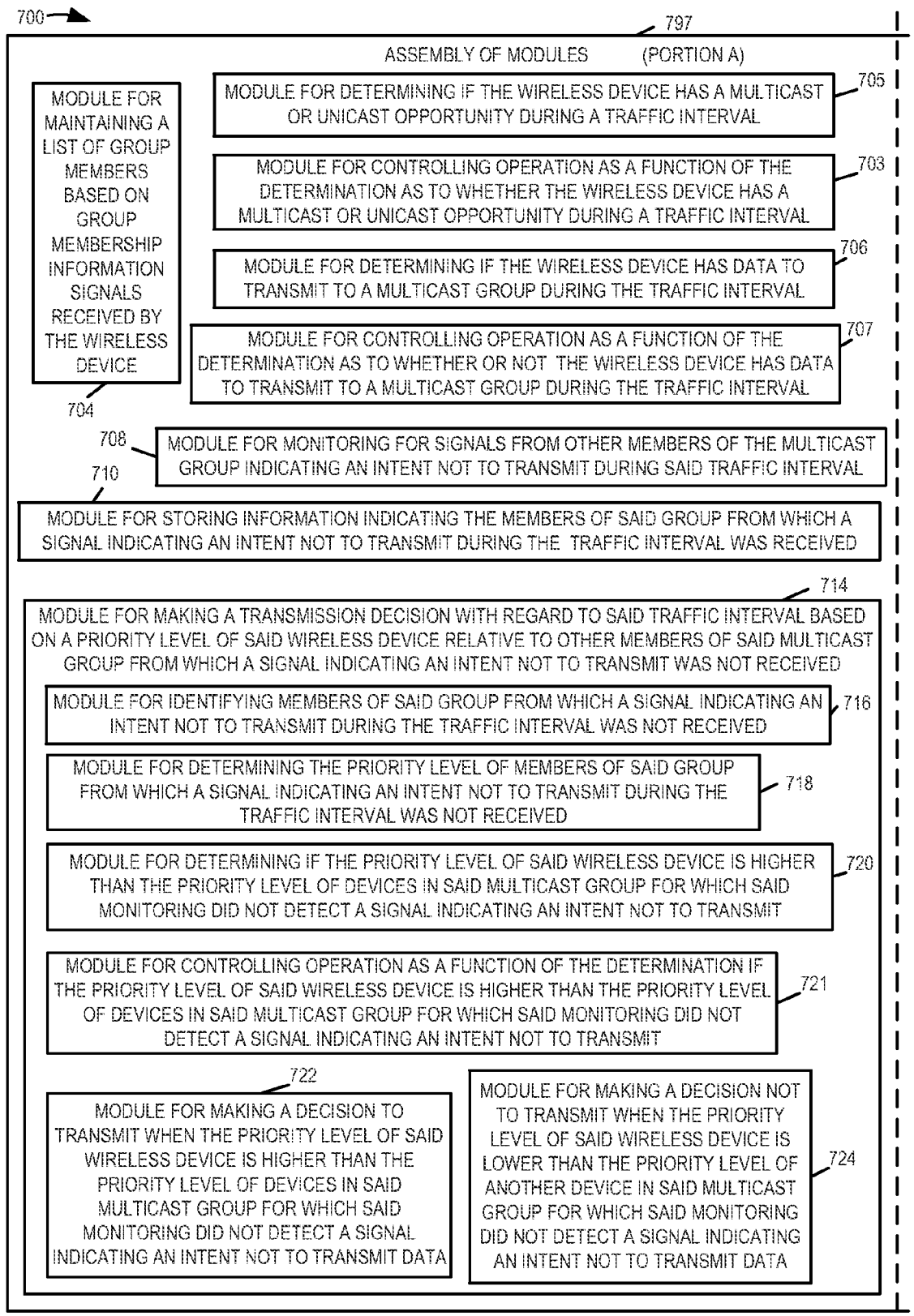
FIG. 7A is drawing of a first portion of assembly of modules which can, and in some embodiments is, used in the exemplary wireless device illustrated in FIG. 6.
Figure 7B:
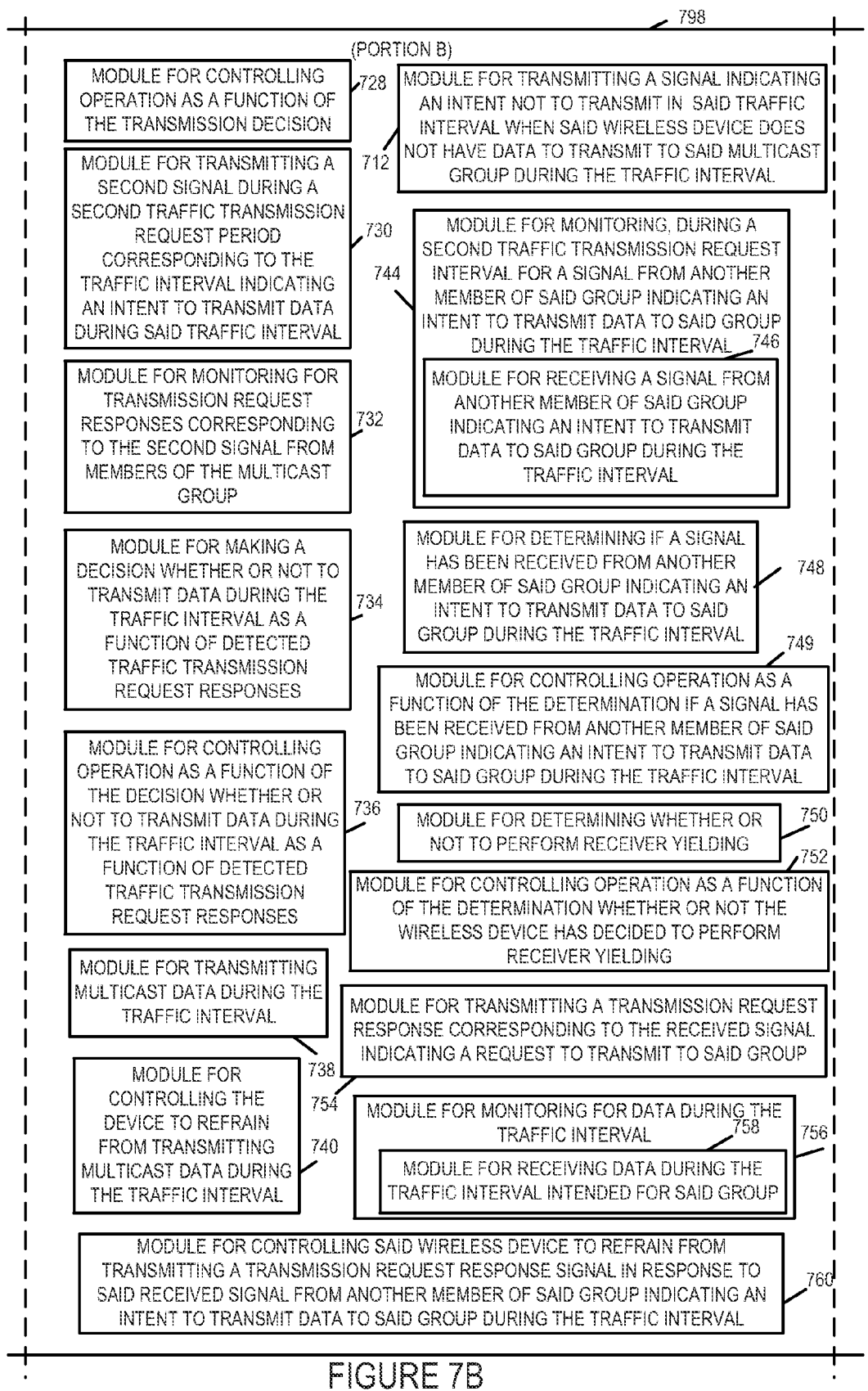
FIG. 7B is drawing of a second portion of assembly of modules which can, and in some embodiments is, used in the exemplary wireless device illustrated in FIG. 6.

FIG. 7, comprising the combination of FIG. 7A, FIG. 7B and FIG. 7C, is an assembly of modules 700, including portion A 797, portion B 798 and portion C 799, which can, and in some embodiments is, used in the exemplary wireless device 600 illustrated in FIG. 6. The modules in the assembly 700 can be implemented in hardware within the processor 602 of FIG. 6, e.g., as individual circuits. Alternatively, the modules may be implemented in software and stored in the memory 604 of wireless device 600 shown in FIG. 6. In some such embodiments, the assembly of modules 700 is included in routines 611 of memory 604 of device 600 of FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In some embodiments, processor 602 is configured to implement each of the modules of the assembly of modules 700. In embodiments where the assembly of modules 700 is stored in the memory 604, the memory 604 is a computer program product comprising a computer readable medium, e.g., a non-transitory computer readable medium, comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the wireless device 600 or elements therein such as the processor 602, to perform the functions of the corresponding steps illustrated and/or described in the method of flowchart 500 of FIG. 5.

Assembly of modules 700 includes a module for maintaining a list of group members based on group membership information signals received by the wireless device 704, a module for determining if the wireless device has a multicast or unicast opportunity during a traffic interval 705, a module for controlling operation as a function of the determination as to whether the wireless device has a multicast or unicast opportunity during a traffic interval 703, a module for determining if the wireless device has data to transmit to a multicast group during the traffic interval 706, and a module for controlling operation as a function of the determination as to whether or not the wireless device has data to transmit to a multicast group during the traffic interval 707. Assembly of modules 700 further includes a module for monitoring for signals from other members of the multicast group indicating an intent not to transmit during the traffic interval 708, a module for storing information indicating the members of said group from which a signal indicating an intent not to transmit during the traffic interval was received 710, and a module for making a transmission decision with regard to said traffic interval based on a priority level of said wireless device relative to other members of said multicast group from which a signal indicating an intent not to transmit was received 714. Module 714 for making a transmission decision includes: a module for identifying members of said group from a signal indicating an intent not to transmit during the traffic interval was not received 716, a module for determining the priority level of members of said group from which a signal indicating an intent not to transmit during the traffic interval was not received 718, a module for determining if the priority level of said wireless device is higher than the priority level of device in said multicast group for which said monitoring did not detect a signal indicating an intent not to transmit 720, a module for controlling operation as a function of the determination if the priority level of said wireless device is higher than the priority level of devices in said multicast group for which said monitoring did not detect a signal indicating an intent not to transmit 721, a module for making a decision to transmit when the priority level of said wireless device is higher than the priority level of devices in said multicast group for which said monitoring did not detect a signal indicating an intent not to transmit data 722 and a module for making a decision not to transmit when the priority level of said wireless device is lower than the priority level of another device in said multicast group for which said monitoring did not detect a signal indicating an intent not to transmit data 724.

Assembly of modules 700 further includes a module for controlling operation as a function of the transmission decision 728, e.g., the transmission decision of step 722 or step 724, a module for transmitting a second signal during a second traffic transmission request period corresponding to the traffic interval indicating an intent to transmit data during said traffic interval 730, a module for monitoring for transmission request responses corresponding to the second signal from members of the multicast group 732, a module for making a decision whether or not to transmit data during the traffic interval as a function of detected traffic transmission request responses 734, a module for controlling operation as a function of the decision whether or not to transmit data during the traffic interval as a function of detected traffic transmission request responses 736, a module for transmitting multicast data during the traffic interval 738, and a module for controlling the wireless device to refrain from transmitting multicast data during the traffic interval 740. Assembly of modules 700 further includes a module for transmitting a signal indicating an intent not to transmit in said traffic interval when said wireless device does not have data to transmit to said multicast group during the traffic interval 712, and a module for monitoring, during a second traffic transmission request interval for a signal from another member of said group indicating an intent to transmit data to said group during the traffic interval 744. Module for monitoring 744 includes a module for receiving a signal from another member of said group indicating an intent to transmit data to said group during the traffic interval 746.

Assembly of modules 700 further includes a module for determining of a signal has been received from another member of said group indicating an intent to transmit data to said group during the traffic interval 748, a module for controlling operation as a function of the determination if a signal has been received from another member of said group indicating an intent to transmit data to said group during the traffic interval 749, a module for determining whether or not to perform receiver yielding 750, a module for controlling operation as a function of the determination whether or not the wireless device has decided to perform receiver yielding 752, a module for transmitting a transmission request response corresponding to the received signal indicating a request to transmit to said group when said wireless device has decided not to perform receiver yielding 754, a module for monitoring for data during the traffic interval 756 and a module for controlling the wireless device to refrain from transmitting a transmission request response signal in response to said received signal from another member of said group indicating an intent to transmit data to said group during the traffic interval when the wireless device has decided to perform receiver yielding 760. Module 756 for monitoring includes a module for receiving data during the traffic interval intended for said group 758.

Assembly of modules 700 further includes a module for determining if the wireless device has unicast data to transmit 766, a module for controlling operation as a function of the determination as to whether or not the wireless device has unicast data to transmit 767, a module for transmitting a unicast signal indicator indicating a request to transmit 768, a module for monitoring for a unicast request response signal in response to the transmitted unicast indicator signal 770, a module for making a decision whether or not to proceed with the intended unicast data transmission during the traffic interval as a function of whether or not a unicast request response was received and a function of expected interference to higher priority connections when a request response signal was received in response to the transmitted unicst indicator signal 772, and a module 774 for controlling operation as a function of the decision whether or not to proceeds with the intended unicast data transmission during the traffic interval. Assembly of modules 700 further includes a module for transmitting unicast data during the traffic interval 776 and a module for controlling the wireless device to refrain from transmitting unicast data during the traffic interval 778.

Figure 8:
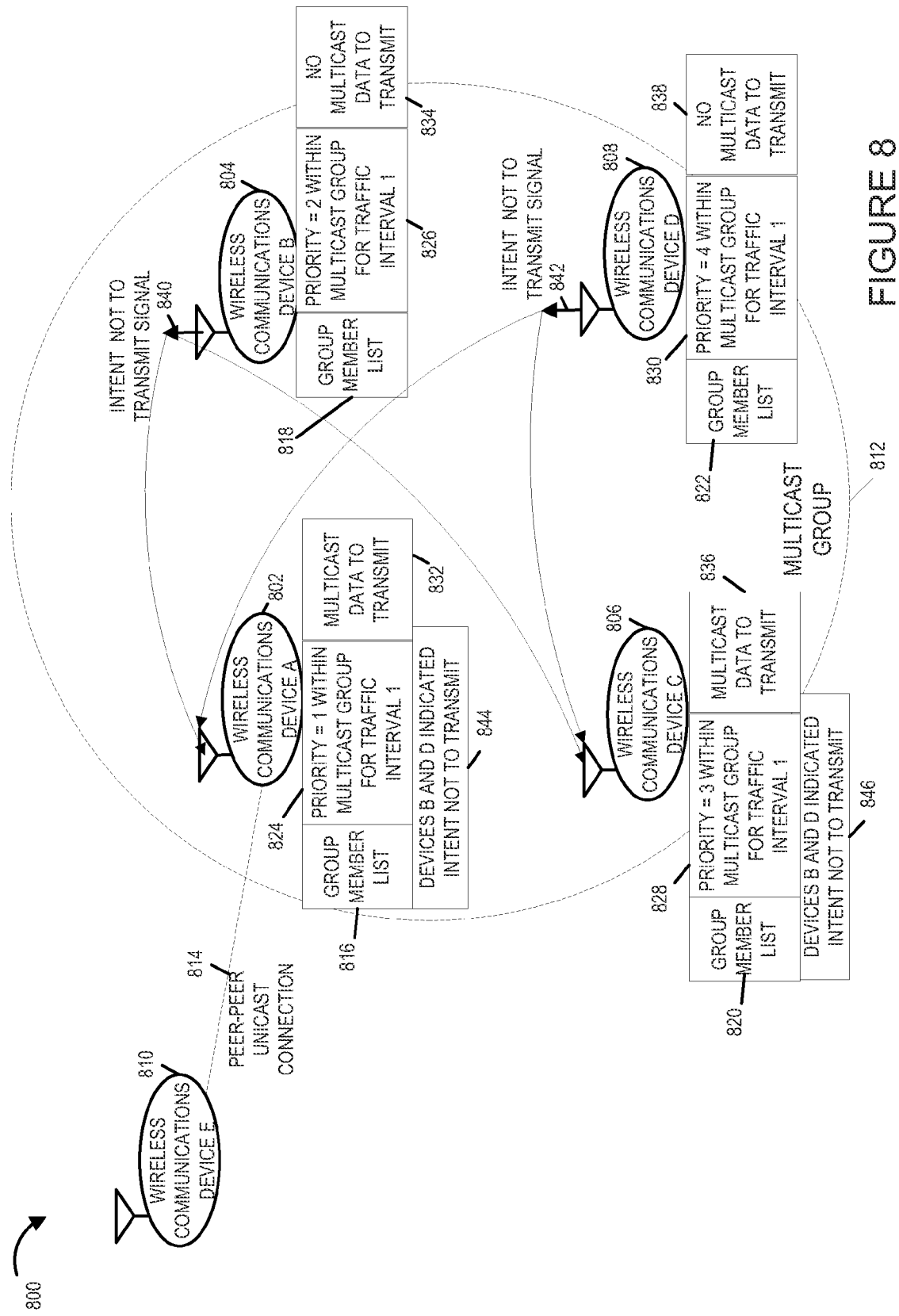
FIG. 8 is a first drawing in a sequence of drawings illustrating an example in which mobile wireless communications device communicate in a peer to peer network supporting multicast signaling and unicast peer to peer signaling in accordance with an exemplary embodiment.

FIG. 8-20 illustrate an example in which mobile wireless communications device communicate in a peer to peer network supporting multicast signaling and unicast peer to signaling in accordance with an exemplary embodiment. Drawing 800 of FIG. 8 illustrates a plurality of mobile wireless communications devices (wireless communications device A 802, wireless communications device B 804, wireless communications device C 806, wireless communications device D 808, wireless communications device E 810). Wireless devices (802, 804, 806, 808, 810) are, e.g., any of the mobile wireless communications devices of system 100 of FIG. 1 and/or implemented in accordance with a method of flowchart 200 of FIG. 2 and/or a method of flowchart 500 of FIG.

5 and/or implemented in accordance with device 300 of FIG. 3 and/or device 600 of FIG. 6.

Wireless communications devices (device A 802, device B 804, device C 806, device E 808) are part of a multicast group which has been formed and is indicated by dotted line circle 812. Device A 802 and device E 810 have a peer to peer unicast connection indicated by dotted line 814. Various air link resources, e.g., time-frequency resources, are associated with the multicast group 812 and the peer to peer unicast connection 814, e.g., resources which are used in connection scheduling for traffic intervals. Each of the members of the multicast group maintains a list of group members based on group membership information signals received by the wireless device. Device A's group member list 816 indicates that device B 804, device C 806 and device D 808 are members of the same multicast group 812 to which it belongs. Device B's group member list 818 indicates that device A 802, device C 806 and device D 808 are members of the same multicast group 812 to which it belongs. Device C's group member list 820 indicates that device A 802, device B 804 and device D 808 are members of the same multicast group 812 to which it belongs. Device D's group member list 822 indicates that device A 802, device B 804 and device C 806 are members of the same multicast group 812 to which it belongs. Within the multicast group, there is a priority associated with each member corresponding to each traffic segment in which a multicast transmission opportunity is possible for the group. In this example, the priority associated with a particular member can, and sometimes does, change from one traffic interval to another, e.g., in accordance with a predetermined pattern known to the members of the multicast group. This approach increases the likelihood that different members of the group will have multicast transmission opportunities when multiple members of the group frequently would like to transmit multicast data to the group during the same traffic interval using the same traffic transmission segment.

FIGS. 8-11 correspond to a first traffic interval. Wireless communications device A 802 has priority=1 within the multicast group for traffic interval 1 as indicated by box 824; wireless communications device B 804 has priority=2 within the multicast group for traffic interval 1 as indicated by box 826; wireless communications device C 806 has priority=3 within the multicast group for traffic interval 1 as indicated by box 828; and wireless communications device D 808 has priority=4 within the multicast group for traffic interval 1 as indicated by box 830. In this example, priority=1 is higher priority than priority=2; priority=2 is higher priority than priority=3; and priority=3 is higher priority than priority=4. Wireless communications device A 802 has multicast data that it would like to transmit in traffic interval 1 as indicated by box 832. Wireless communications device B 804 does not have multicast data that it would like to transmit in traffic interval 1 as indicated by box 834. Wireless communications device C 806 has multicast data that it would like to transmit in traffic interval 1 as indicated by box 836. Wireless communications device D 808 does not have multicast data that it would like to transmit in traffic interval 1 as indicated by box 838.

The devices of the multicast group which do not intend to transmit during traffic interval 1 (device B 804, device D 808), generate and transmit signals (840, 842) respectively, indicating an intent not to transmit multicast traffic data during the first traffic interval. Signals (840, 842) are transmitted during a first traffic transmission request period corresponding to the first traffic interval. Wireless devices (device A 802, device C 806) have been monitoring for signals from other members of the multicast group indicating an intent not to transmit during the first traffic interval, and received signals 840 and 842. Wireless device A 802 determines from received signal 840 that wireless device B 804 has indicated an intent not to transmit and determines from received signal 842 that wireless device D 808 has indicated an intent not to transmit. Wireless device A 802 stores information 844 indicating that device B 804 and device D 808 have indicated an intent not to transmit for the first traffic interval. Wireless device C 806 determines from received signal 842 that wireless device B 804 has indicated an intent not to transmit and determines from received signal 842 that wireless device D 808 has indicated an intent not to transmit. Wireless device C 806 stores information 846 indicating that device B 804 and device D 808 have indicated an intent not to transmit for the first traffic interval.

Figure 9:
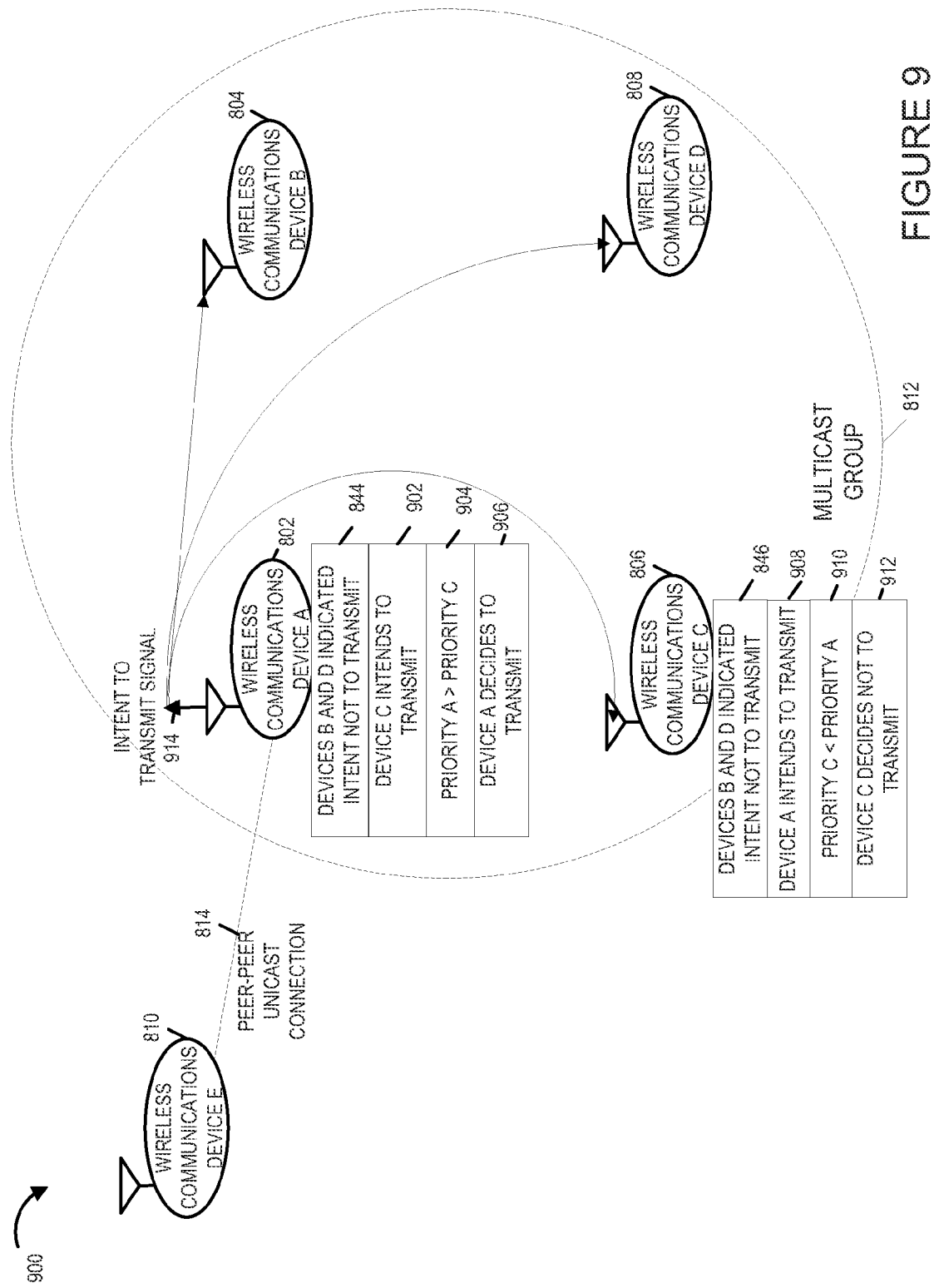
FIG. 9 is a second drawing in a sequence of drawings illustrating an example in which mobile wireless communications device communicate in a peer to peer network supporting multicast signaling and unicast peer to peer signaling in accordance with an exemplary embodiment.

In drawing 900 of FIG. 9, wireless communications device A 802 determines from information 844 and group member list 816, that device C 806 intends to transmit multicast data during the first traffic interval as indicated by block 902. Wireless device A 802 compares its own priority, as indicated by block 824 to the priority of device C, as indicated by block 828, and determines that device A has higher priority than device C for traffic interval 1 as indicated by block 904. Wireless device A 802 to proceed with its intended multicast data transmission in traffic interval 1 based on the priority comparison, as indicated by block 906.

Wireless communications device C 806 determines from information 846 and group member list 820, that device A 802 intends to transmit multicast data during the first traffic interval as indicated by block 908. Wireless device C 806 compares its own priority, as indicated by block 828 to the priority of device A, as indicated by block 824, and determines that device C has lower priority than device A for traffic interval 1 as indicated by block 910. Wireless device C 806 decides not to transmit in traffic interval 1 based on the priority comparison, as indicated by block 912.

Wireless device A 802 transmits signal 914 during a second traffic transmission request period corresponding to the first traffic interval. Signal 914 which indicates an intent to transmit multicast data during the first traffic interval is received by wireless devices (device B 804, device C 806, device D 808).

Figure 10:
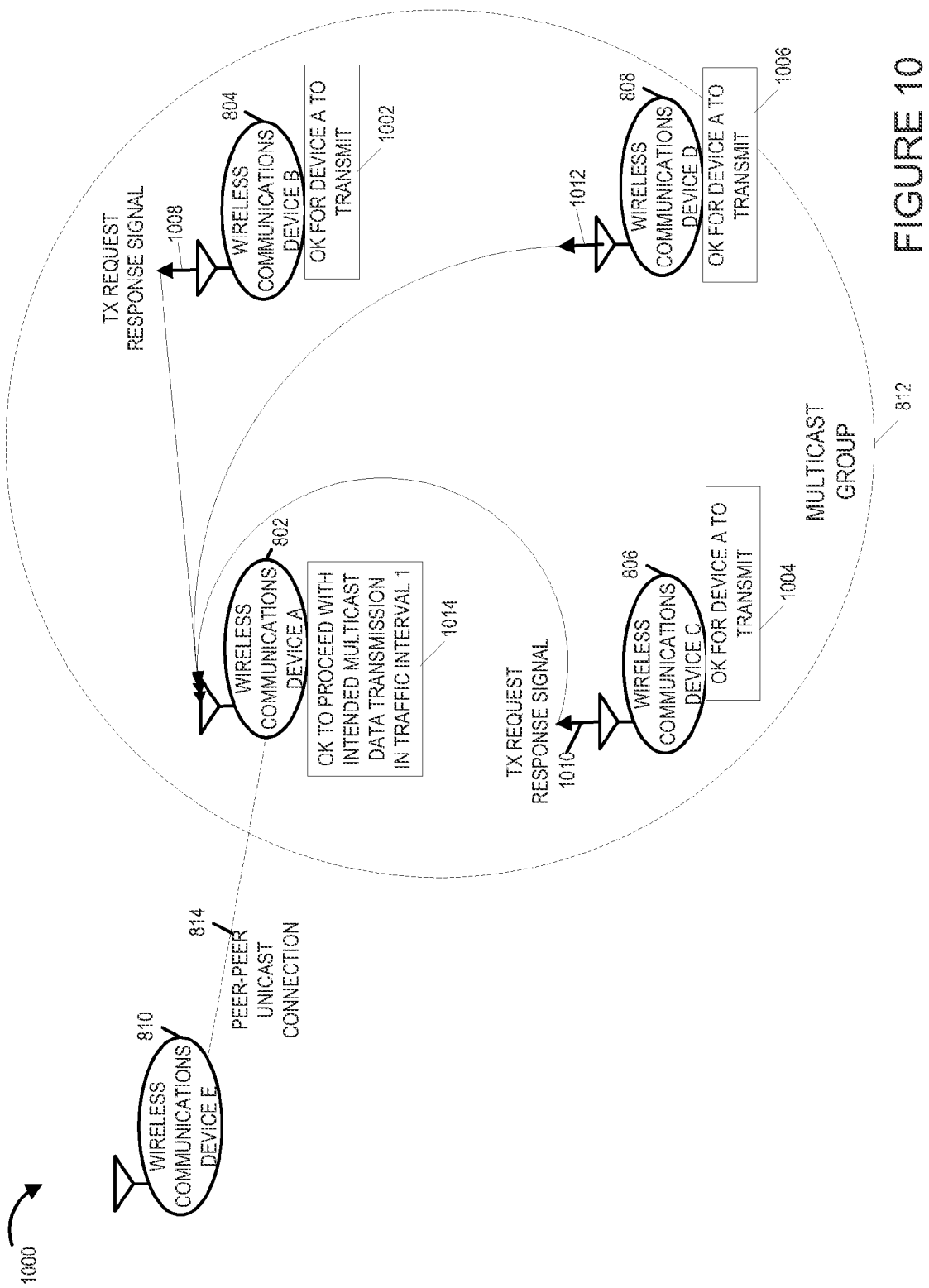
FIG. 10 is a third drawing in a sequence of drawings illustrating an example in which mobile wireless communications devices communicate in a peer to peer network supporting multicast signaling and unicast peer to peer signaling in accordance with an exemplary embodiment.

In drawing 1000 of FIG. 10, the wireless devices (device B 804, device C 806, device D 808), decide that it is ok for the intended multicast data transmission from device A 802 to proceed, as indicated by blocks (1002, 1004, 1006). For example, the devices (804, 806, 808) have estimated that if the transmission proceeds, they will be able to recover the transmitted signal, e.g., their expected SINR will be acceptable. Devices (804, 806, 808) generate and transmit transmission request response signals (1008, 1010, 1012), respectively, corresponding to transmission request signal 914. The signals (1008, 1010, 1012) are transmitted during a request response interval corresponding to the first traffic interval. Wireless communications device A 802 has been monitoring for request response signals corresponding to signal 914 from members of its multicast group and detects signals (1008, 1010, 1012). Wireless device A 802 decides that it is ok to proceed with the intended multicast data transmission in traffic interval 1 as indicated by box 1014.

Figure 11:
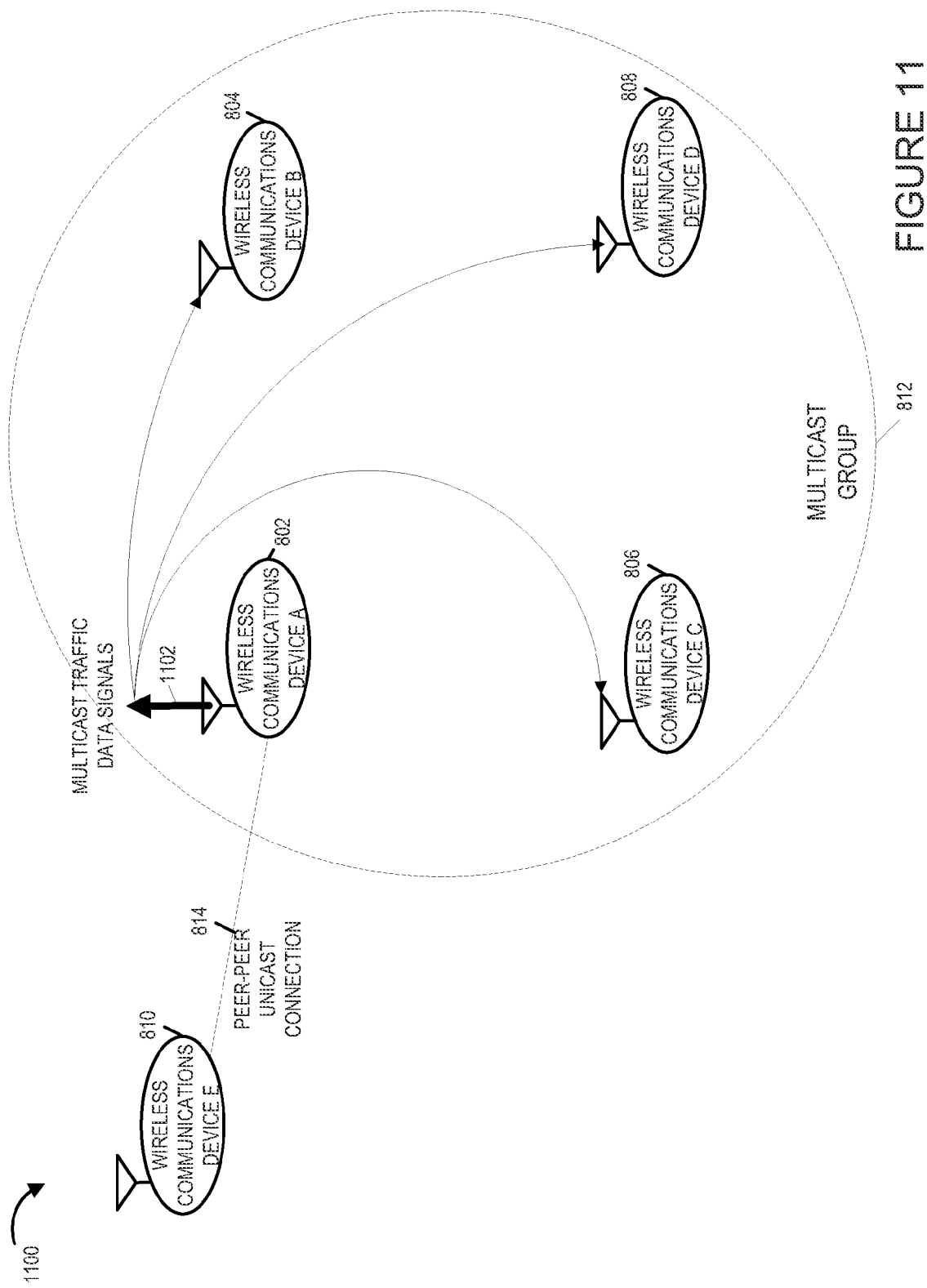
FIG. 11 is a fourth drawing in a sequence of drawings illustrating an example in which mobile wireless communications devices communicate in a peer to peer network supporting multicast signaling and unicast peer to peer signaling in accordance with an exemplary embodiment.
Figure 12:
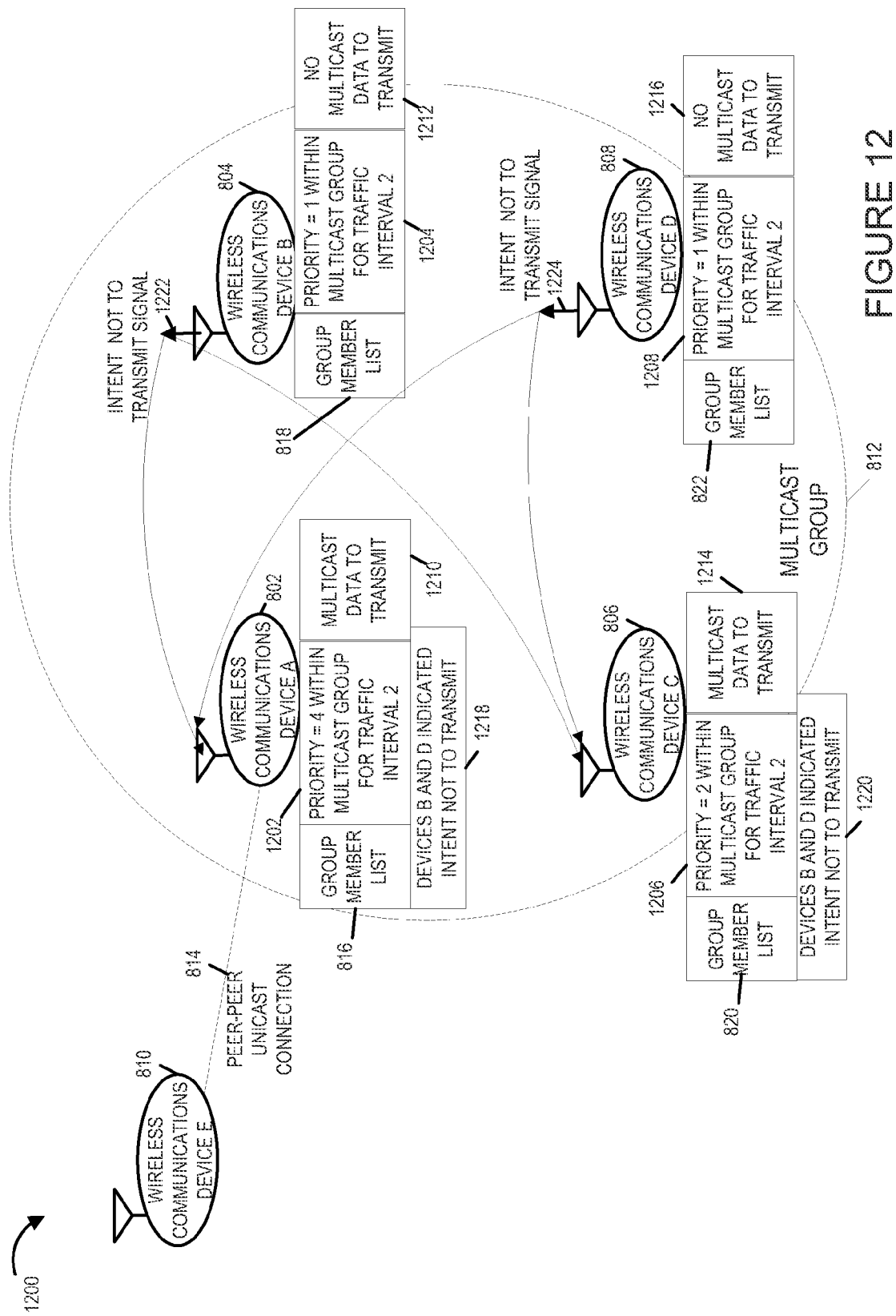
FIG. 12 is a fifth drawing in a sequence of drawings illustrating an example in which mobile wireless communications device communicate in a peer to peer network supporting multicast signaling and unicast peer to peer signaling in accordance with an exemplary embodiment.

In drawing 1100 of FIG. 11, wireless communications device A 802 transmits multicast traffic data signals 1102 in the first traffic interval. Signals 1102 are received and recovered by the other members of its multicast (device B 804, device C 806, device D 808.)

FIGS. 12-15 correspond to a second traffic interval. Wireless communications device A 802 has priority=4 within the multicast group for traffic interval 2 as indicated by box 1202;

wireless communications device B 804 has priority=1 within the multicast group for traffic interval 2 as indicated by box 1204; wireless communications device C 806 has priority=2 within the multicast group for traffic interval 2 as indicated by box 1206; and wireless communications device D 808 has priority=1 within the multicast group for traffic interval 2 as indicated by box 1208. Wireless communications device A 802 has multicast data that it would like to transmit in traffic interval 2 as indicated by box 1210. Wireless communications device B 804 does not have multicast data that it would like to transmit in traffic interval 2 as indicated by box 1212. Wireless communications device C 806 has multicast data that it would like to transmit in traffic interval 2 as indicated by box 1214. Wireless communications device D 808 does not have multicast data that it would like to transmit in traffic interval 2 as indicated by box 1216.

The devices of the multicast group which do not intend to transmit during traffic interval 2 (device B 804, device D 808), generate and transmit signals (1222, 1224) respectively, indicating an intent not to transmit multicast traffic data during the second traffic interval. Signals (1222, 1224) are transmitted during a first traffic transmission request period corresponding to the second traffic interval. Wireless devices (device A 802, device C 806) have been monitoring for signals from other members of the multicast group indicating an intent not to transmit during the second traffic interval, and receive signals 1222 and 1224. Wireless device A 802 determines from received signal 1222 that wireless device B 804 has indicated an intent not to transmit and determines from received signal 1224 that wireless device D 808 has indicated an intent not to transmit. Wireless device A 802 stores information 1218 indicating that device B 804 and device D 808 have indicated an intent not to transmit for the second traffic interval. Wireless device C 806 determines from received signal 1222 that wireless device B 804 has indicated an intent not to transmit and determines from received signal 1224 that wireless device D 808 has indicated an intent not to transmit. Wireless device C 806 stores information 1220 indicating that device B 804 and device D 808 have indicated an intent not to transmit for the second traffic interval.

Figure 13:
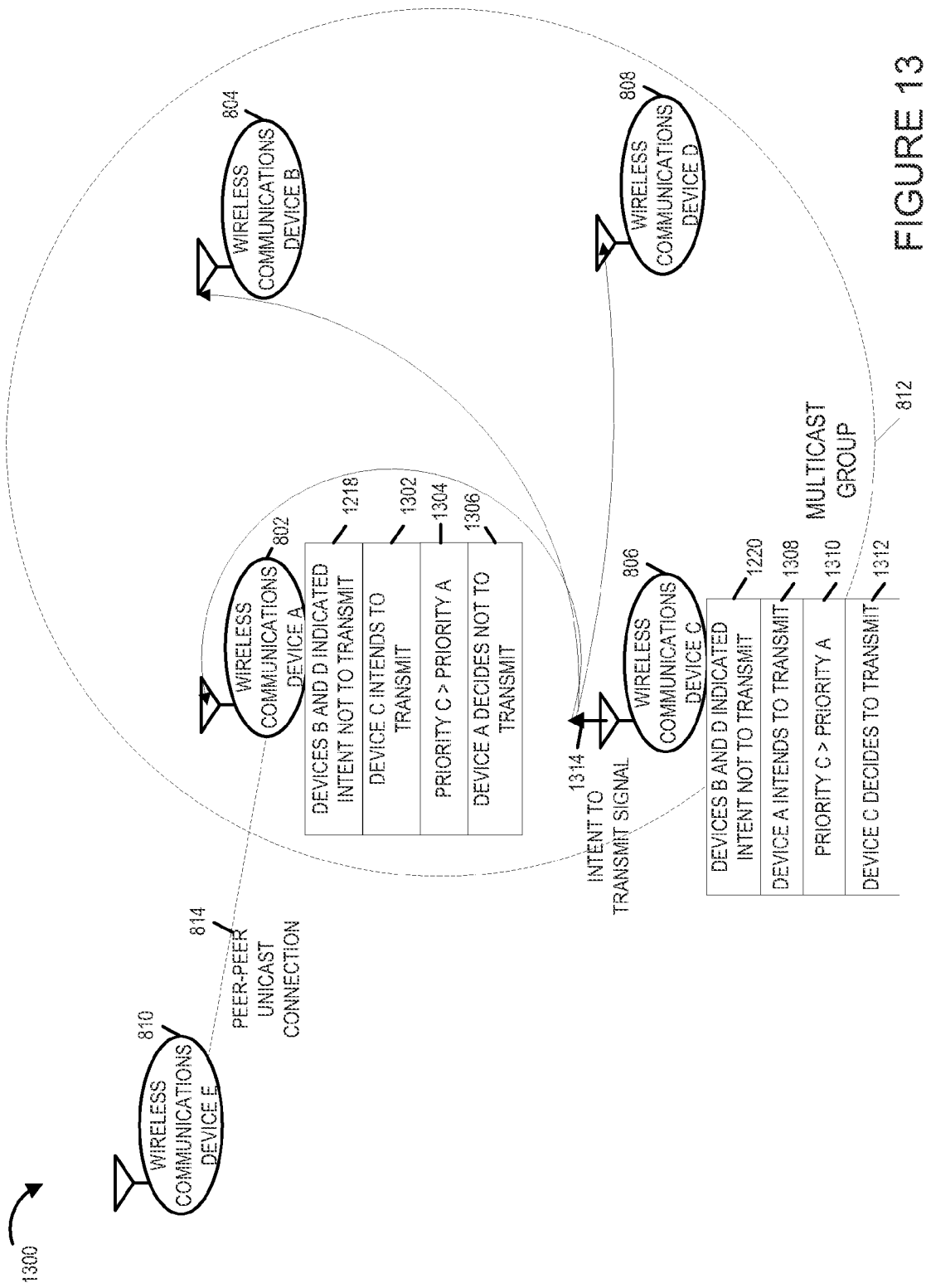
FIG. 13 is a sixth drawing in a sequence of drawings illustrating an example in which mobile wireless communications devices communicate in a peer to peer network supporting multicast signaling and unicast peer to peer signaling in accordance with an exemplary embodiment.

In drawing 1300 of FIG. 13, wireless communications device A 802 determines from information 1218 and group member list 816, that device C 806 intends to transmit multicast data during the second traffic interval as indicated by block 1302. Wireless device A 802 compares its own priority, as indicated by block 1202 to the priority of device C, as indicated by block 1206, and determines that device A has lower priority than device C for traffic interval 2 as indicated by block 1304. Wireless device A 802 decides not to transmit in traffic interval 2 based on the priority comparison, as indicated by block 1306.

Wireless communications device C 806 determines from information 1220 and group member list 820, that device A 802 intends to transmit multicast data during the second traffic interval as indicated by block 1308. Wireless device C 806 compares its own priority, as indicated by block 1206 to the priority of device A, as indicated by block 1202, and determines that device C has higher priority than device A for traffic interval 2 as indicated by block 1310. Wireless device C 806 decides to proceed with its intended multicast data transmission in traffic interval 2 based on the priority comparison, as indicated by block 1312.

Wireless device C 806 transmits signal 1314 during a second traffic transmission request period corresponding to the second traffic interval. Signal 1314 which indicates an intent to transmit multicast data during the second traffic interval is received by wireless devices (device A 802, device B 804, device D 808).

Figure 14:
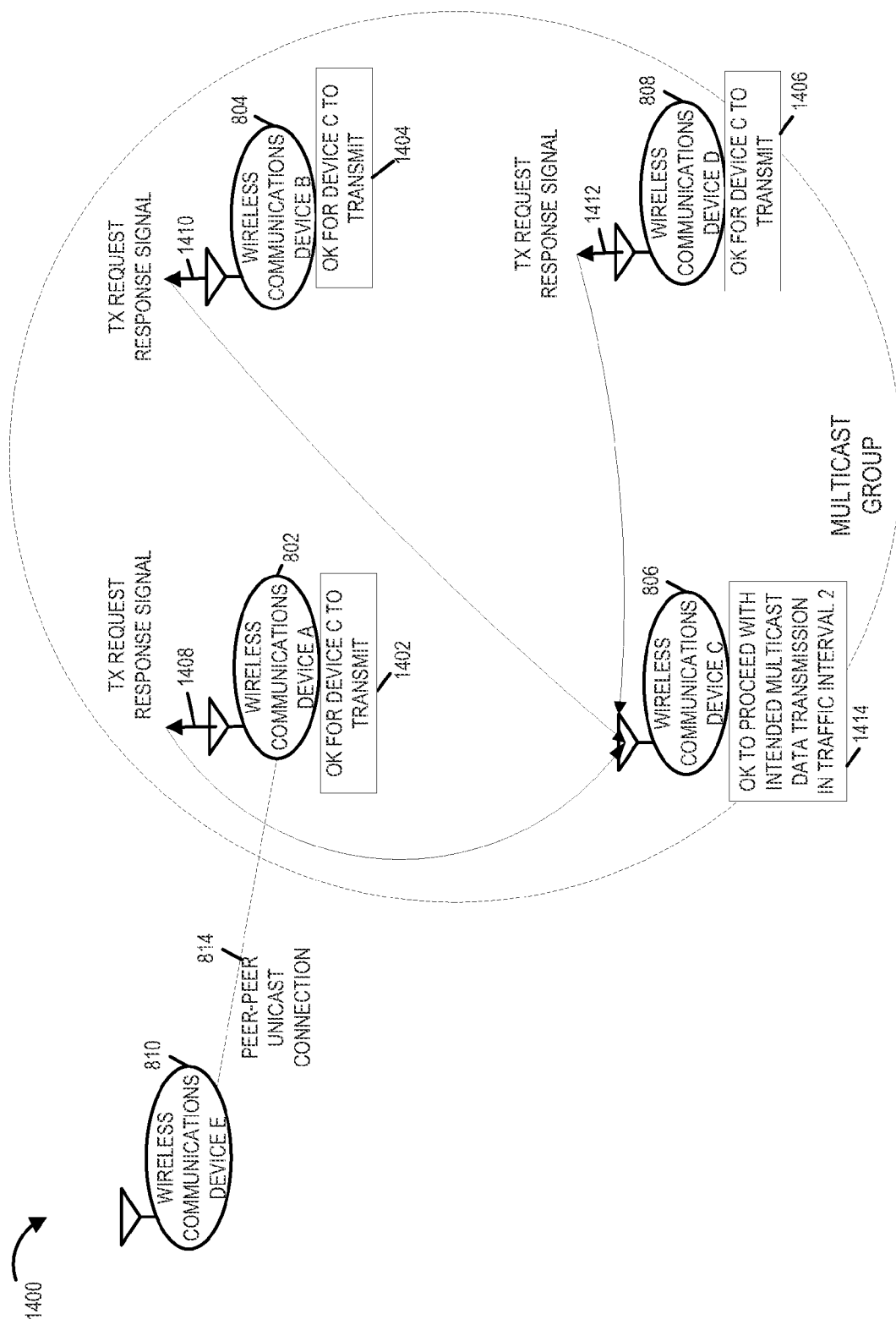
FIG. 14 is a seventh drawing in a sequence of drawings illustrating an example in which mobile wireless communications devices communicate in a peer to peer network supporting multicast signaling and unicast peer to peer signaling in accordance with an exemplary embodiment.

In drawing 1400 of FIG. 14, the wireless devices (device A 802, device B 804, device D 808), decide that it is ok for the intended multicast data transmission from device C 806 to proceed, as indicated by blocks (1402, 1404, 1406). For example, the devices (802, 804, 808) have estimated that if the transmission proceeds, they will be able to recover the transmitted signal, e.g., their expected SINR will be acceptable. Devices (802, 804, 808) generate and transmit transmission request response signals (1408, 1410, 1412), respectively, corresponding to transmission request signals 1314. The signals (1408, 1410, 1412) are transmitted during a request response interval corresponding to the second traffic interval. Wireless communications device C 806 has been monitoring for request response signals corresponding to signal 1314 from members of its multicast group and detects signals (1408, 1410, 1412). Wireless device C 806 decides that it is ok to proceed with the intended multicast data transmission in traffic interval 2 as indicated by box 1414.

Figure 15:
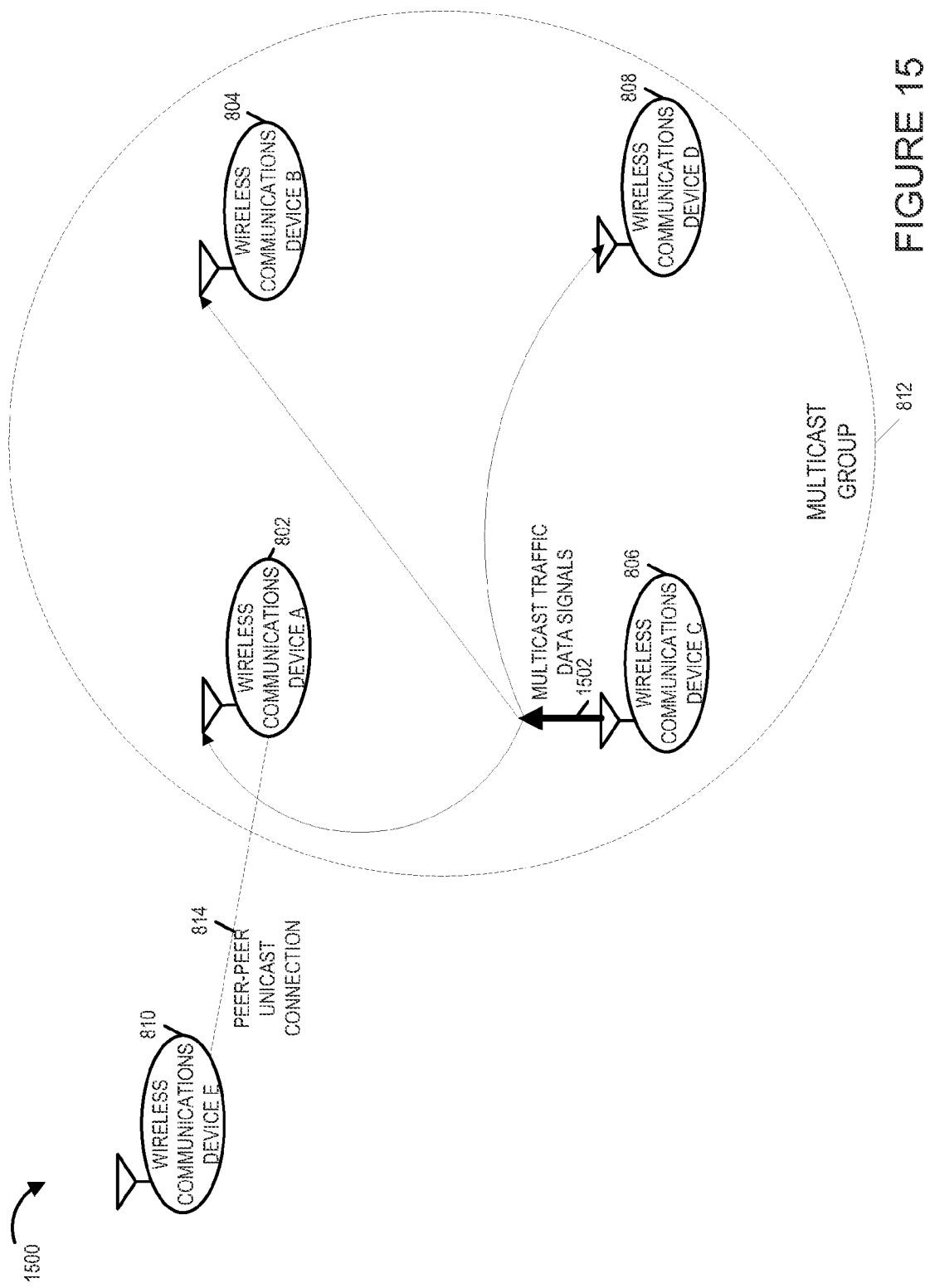
FIG. 15 is an eighth drawing in a sequence of drawings illustrating an example in which mobile wireless communications devices communicate in a peer to peer network supporting multicast signaling and unicast peer to peer signaling in accordance with an exemplary embodiment.
Figure 16:
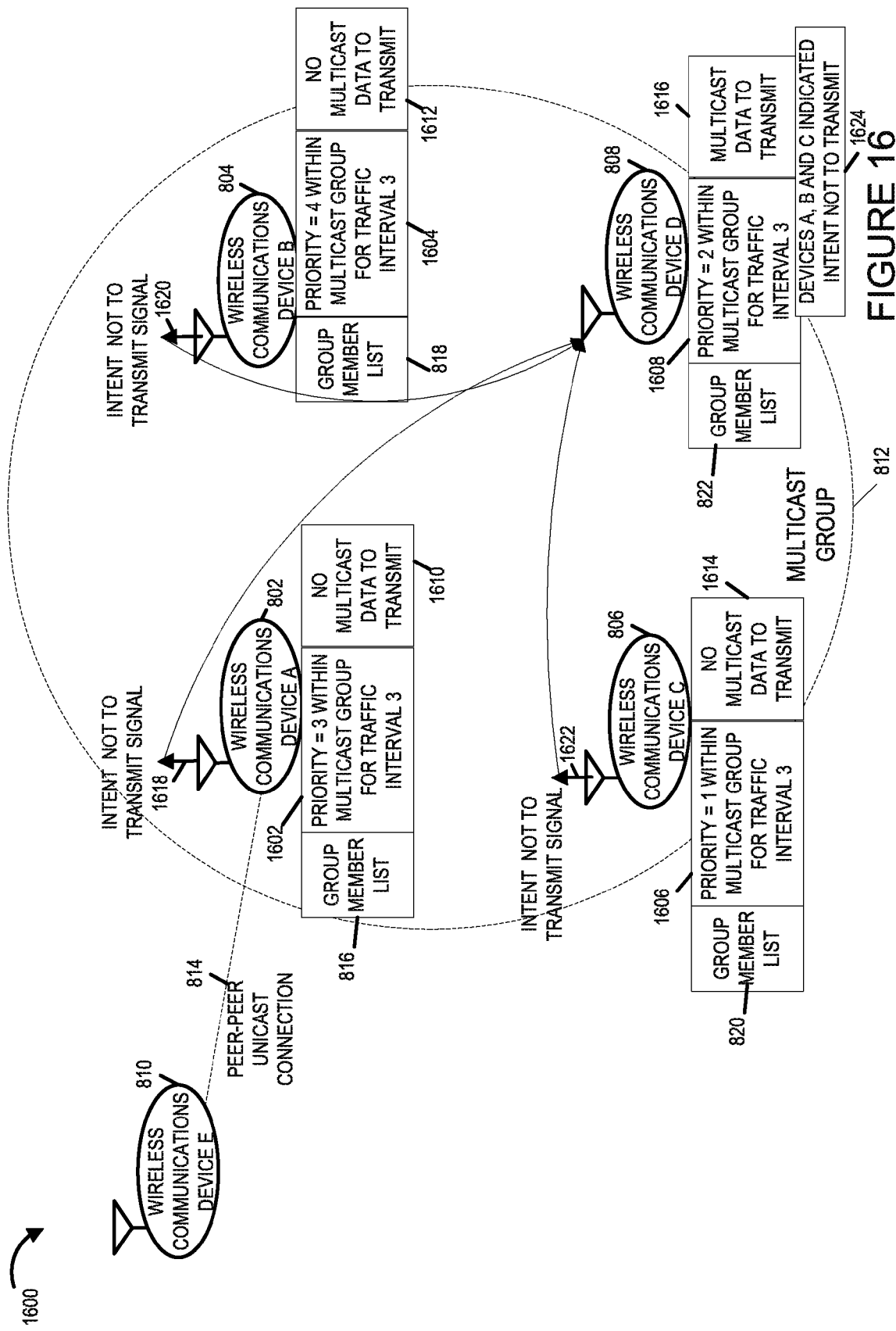
FIG. 16 is a ninth drawing in a sequence of drawings illustrating an example in which mobile wireless communications devices communicate in a peer to peer network supporting multicast signaling and unicast peer to peer signaling in accordance with an exemplary embodiment.

In drawing 1500 of FIG. 15, wireless communications device C 806 transmits multicast traffic data signals 1502 in the second traffic interval. Signals 1502 are received and recovered by the other members of its multicast (device A 802, device B 804, device D 808.)

FIGS. 16-19 correspond to a third traffic interval. Wireless communications device A 802 has priority=3 within the multicast group for traffic interval 3 as indicated by box 1602; wireless communications device B 804 has priority=4 within the multicast group for traffic interval 3 as indicated by box 1604; wireless communications device C 806 has priority=1 within the multicast group for traffic interval 3 as indicated by box 1606; and wireless communications device D 808 has priority=2 within the multicast group for traffic interval 3 as indicated by box 1608. Wireless communications device A 802 does not have multicast data that it would like to transmit in traffic interval 3 as indicated by box 1610. Wireless communications device B 804 does not have multicast data that it would like to transmit in traffic interval 3 as indicated by box 1612. Wireless communications device C 806 does not have multicast data that it would like to transmit in traffic interval 3 as indicated by box 1614. Wireless communications device D 808 has multicast data that it would like to transmit in traffic interval 3 as indicated by box 1616.

The devices of the multicast group which do not intend to transmit during traffic interval 3 (device A 802, device B 804, device C 806), generate and transmit signals (1618, 1620, 1622) respectively, indicating an intent not to transmit multicast traffic data during the third traffic interval. Signals (1618, 1620, 1622) are transmitted during a first traffic transmission request period corresponding to the third traffic interval. Wireless device D 808 has been monitoring for signals from other members of the multicast group indicating an intent not to transmit during the third traffic interval, and receive signals 1618, 1620, and 1622. Wireless device D 808 determines from received signal 1618 that wireless device A 802 has indicated an intent not to transmit. Wireless device D 808 determines from received signal 1620 that wireless device B 804 has indicated an intent not to transmit. Wireless device D 808 determines from received signal 1622 that wireless device C 806 has indicated an intent not to transmit. Wireless device D 808 stores information 1624 indicating that device A 802, device B 804 and device C 806 have indicated an intent not to transmit for the third traffic interval.

Figure 17:
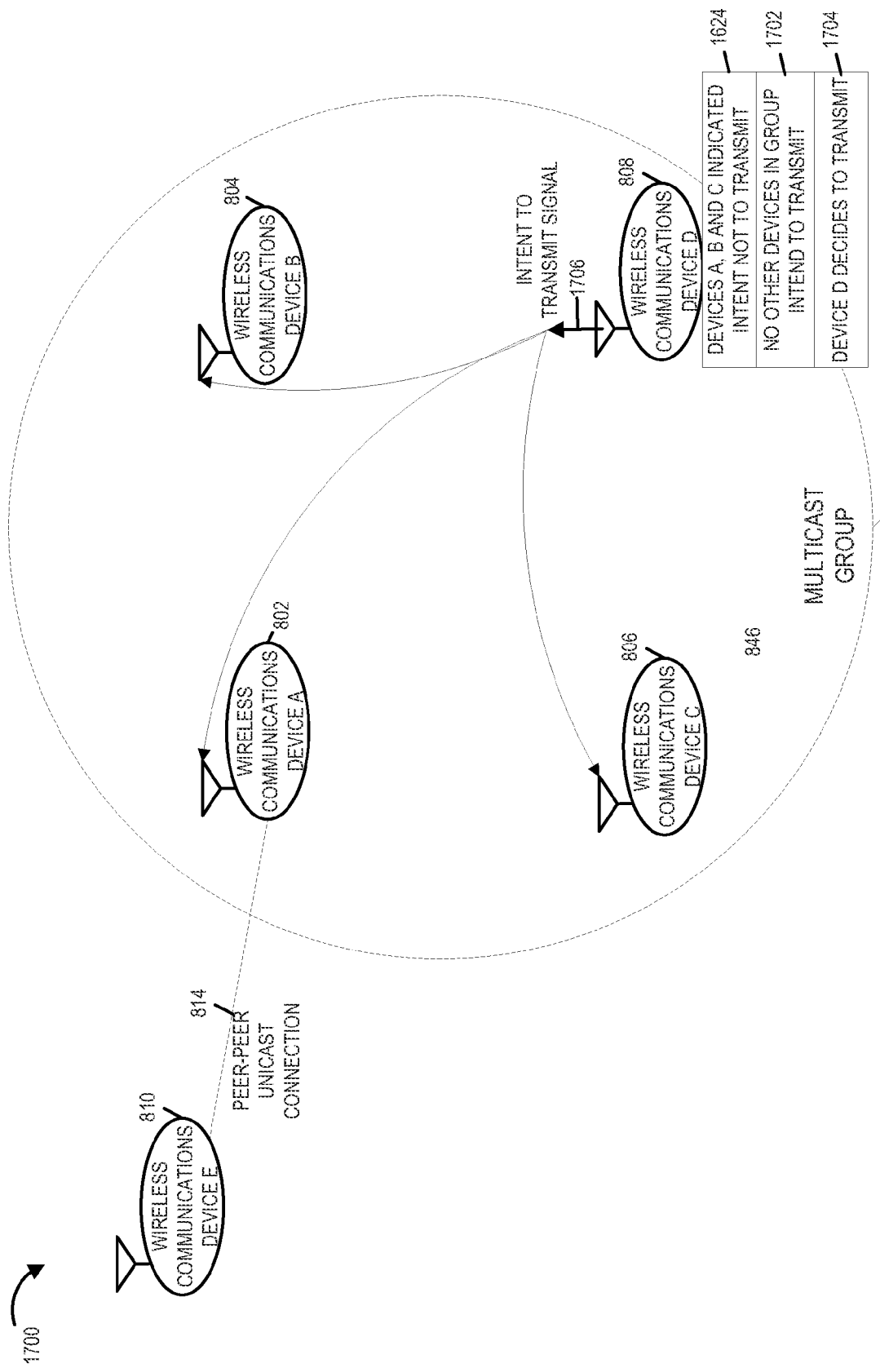
FIG. 17 is a tenth drawing in a sequence of drawings illustrating an example in which mobile wireless communications devices communicate in a peer to peer network supporting multicast signaling and unicast peer to peer signaling in accordance with an exemplary embodiment.

In drawing 1700 of FIG. 17, wireless communications device D 808 determines from information 1624 and group member list 822, that no other devices in its multicast group intend to transmit multicast data in the third traffic interval, as indicated by block 1702. Wireless device D 808 decides to transmit in traffic interval 3 based on the determination of block 1702, as indicated by block 1704.

Wireless device D 808 transmits signal 1706 during a second traffic transmission request period corresponding to the third traffic interval. Signal 1706 which indicates an intent to transmit multicast data during the third traffic interval is received by wireless devices (device A 802, device B 804, device C 806).

Figure 18:
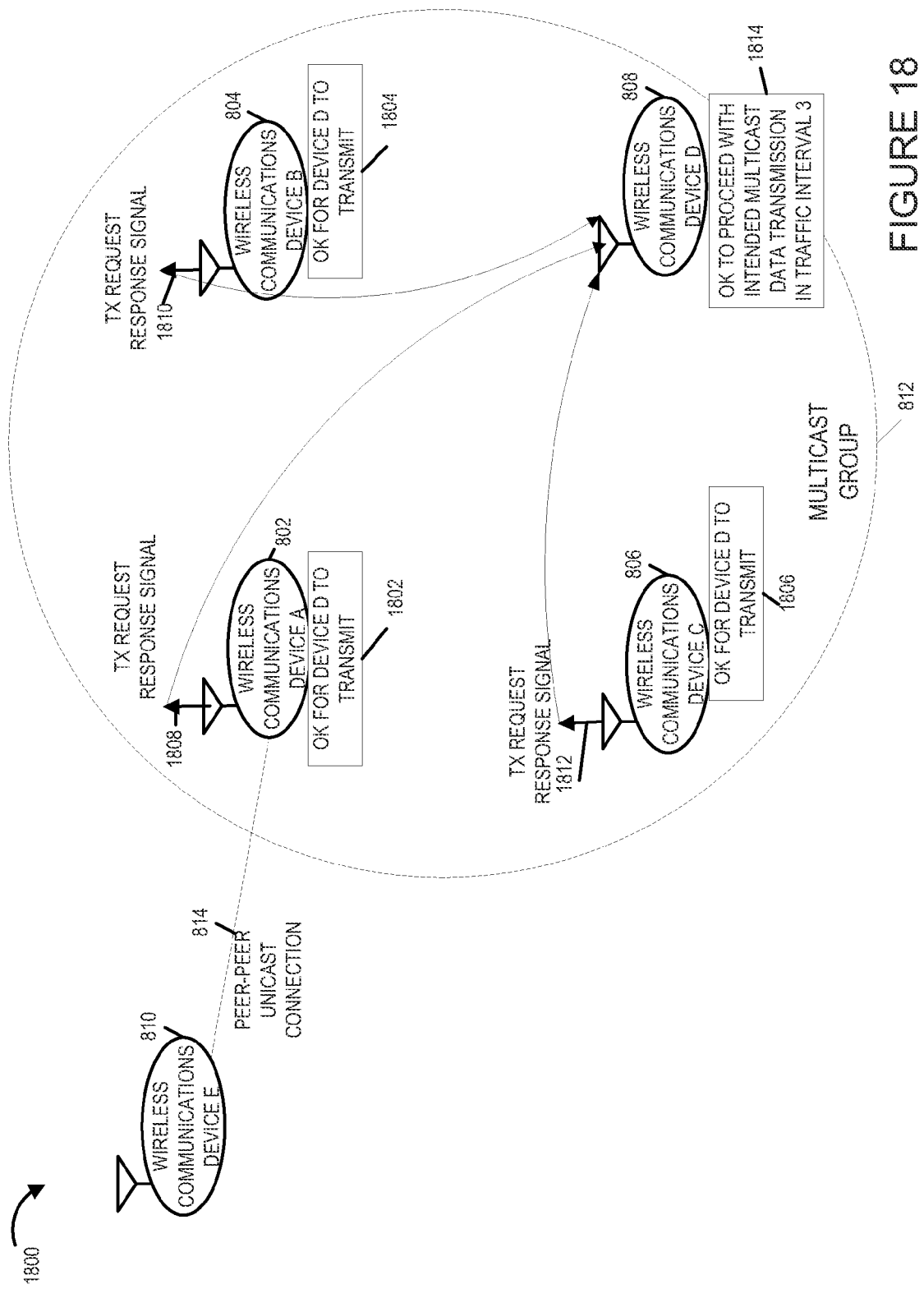
FIG. 18 is an eleventh drawing in a sequence of drawings illustrating an example in which mobile wireless communications devices communicate in a peer to peer network supporting multicast signaling and unicast peer to peer signaling in accordance with an exemplary embodiment.

In drawing 1800 of FIG. 18, the wireless devices (device A 802, device B 804, device C 806), decide that it is ok for the intended multicast data transmission from device D 808 to proceed, as indicated by blocks (1802, 1804, 1806). For example, the devices (802, 804, 806) have estimated that if the transmission proceeds, they will be able to recover the transmitted signal, e.g., their expected SINR will be acceptable. Devices (802, 804, 806) generate and transmit transmission request response signals (1808, 1810, 1812), respectively, corresponding to transmission request signal 1706. The signals (1808, 1810, 1812) are transmitted during a request response interval corresponding to the second traffic interval. Wireless communications device C 806 has been monitoring for request response signals corresponding to signal 1706 from members of its multicast group and detects signals (1808, 1810, 1812). Wireless device D 808 decides that it is ok to proceed with the intended multicast data transmission in traffic interval 3 as indicated by box 1814.

Figure 19:
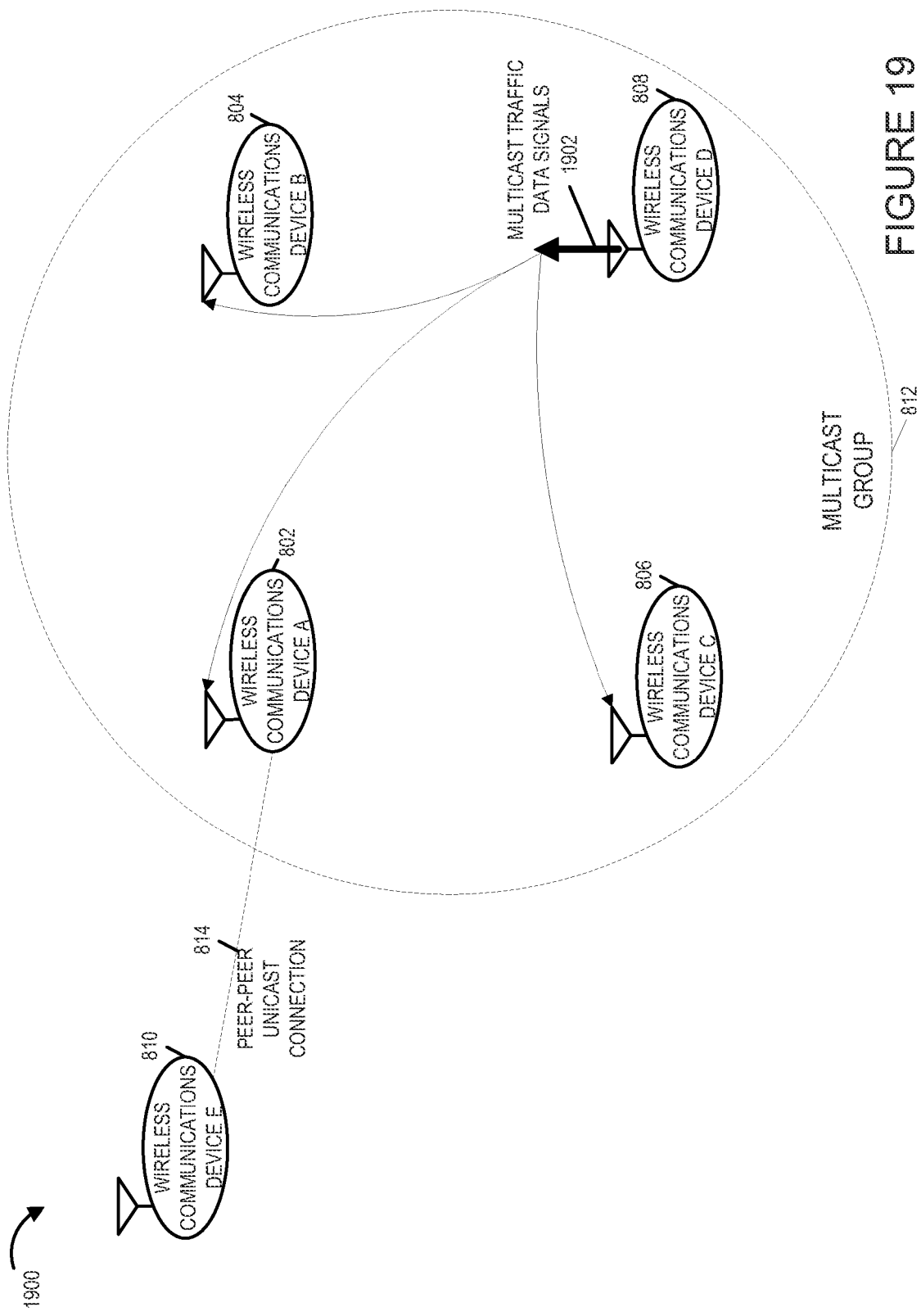
FIG. 19 is a twelfth drawing in a sequence of drawings illustrating an example in which mobile wireless communications devices communicate in a peer to peer network supporting multicast signaling and unicast peer to peer signaling in accordance with an exemplary embodiment.

In drawing 1900 of FIG. 19, wireless communications device D 808 transmits multicast traffic data signals 1902 in the third traffic interval. Signals 1902 are received and recovered by the other members of its multicast (device A 802, device B 804, device C 806.)

Figure 20:
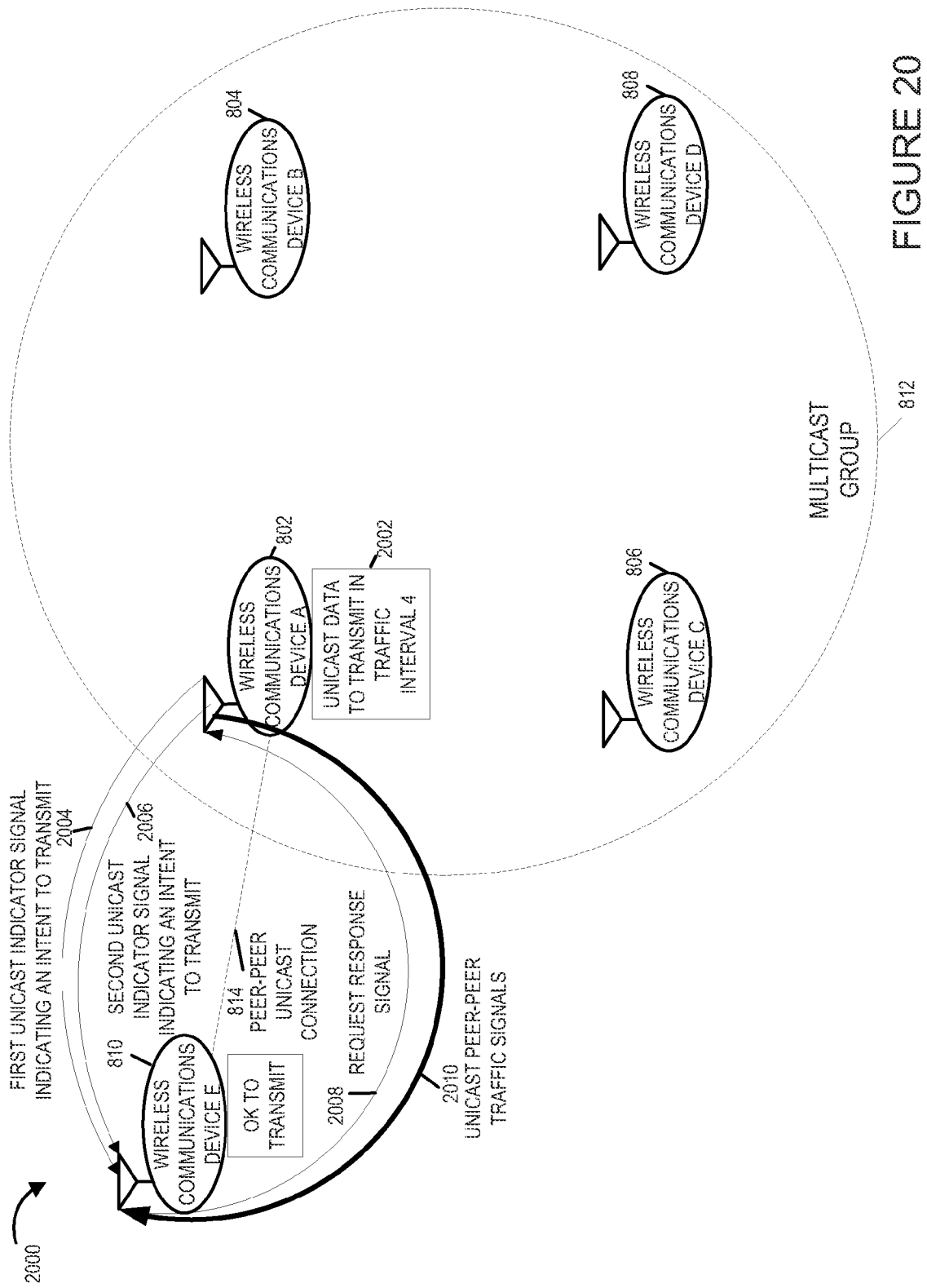
FIG. 20 is a thirteenth drawing in a sequence of drawings illustrating an example in which mobile wireless communications devices communicate in a peer to peer network supporting multicast signaling and unicast peer to peer signaling in accordance with an exemplary embodiment.

FIG. 20 correspond to a fourth traffic interval. In drawing 2000 of FIG. 20 wireless communications device A 802 has unicast data that it would like to transmit in the fourth traffic interval over peer to peer unicast connection 814 to wireless communications device E 810. Wireless communications device A 802 generates a first unicast indicator signal 2004 indicating an intent to transmit unicast data to device E 810 during the fourth traffic interval. The generated first unicast indicator signal is transmitted during a first traffic transmission request interval corresponding to the fourth traffic interval. High priority unicast connections are allocated resources to transmit in the first traffic transmission request interval. The signal 2004 is received by device E 810. Wireless communications device A 802 generates a second unicast indicator signal 2006 indicating an intent to transmit unicast data to device E 810 during the fourth traffic interval. The generated first unicast indicator signal is transmitted during a second traffic transmission request interval corresponding to the fourth traffic interval. The signal 2006 is received by device E 810. Consider that wireless device E 810, has decided not to perform receiver yielding, e.g., it wants the intended unicast transmission from device A 802 to proceed. Wireless device E 810 generates request response signal 2008 and transmits request response signal 2008 to device A 802 during a transmission request response interval corresponding to the fourth traffic interval. Wireless device A 802 receives signal 2008 and decides to proceed with the intended transmission. Wireless device A 802 generates and transmits unicast peer to peer traffic signals 2010 to wireless device E 810 during the fourth traffic interval. Wireless device E 810 receives and recovers the unicast peer to peer traffic signals 2010.

Figure 21:
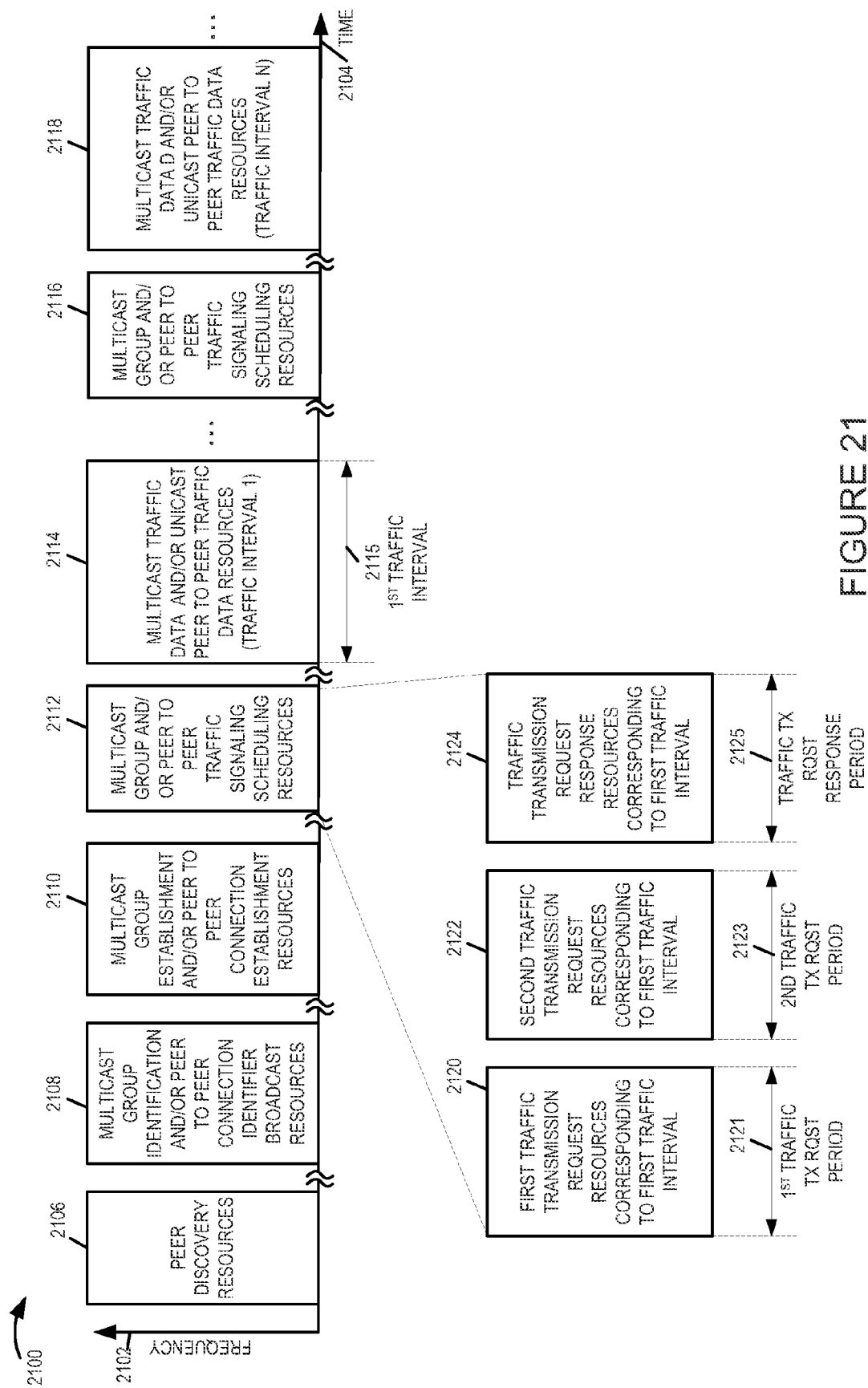
FIG. 21 is a drawing of an exemplary recurring timing/frequency structure used in various embodiments.

FIG. 21 is a drawing 2100 of an exemplary recurring timing/frequency structure used in various embodiments. Exemplary timing frequency structure 2100 is, e.g., implemented in device 300 of FIG. 3 or device 600 of FIG. 6. Drawing 2100 includes a vertical axis 2102 representing frequency, e.g., OFDM tones, and a horizontal axis 2104 representing time, e.g., OFDM symbol transmission time periods. The exemplary recurring timing frequency structure includes peer discovery resources 2106, multicast group identification and/or peer to peer connection identifier broadcast resources 2108, multicast group establishment and/or peer to peer connection establishment resources 2110, and a plurality of sets of scheduling resources and corresponding traffic resources ((multicast group and/or peer to peer traffic signaling scheduling resources 2112, multicast group and/or unicast peer to peer traffic signaling data resources 2114 for a first traffic interval 2115), . . . , (multicast group and/or peer to peer traffic signaling scheduling resources 2116, multicast group and/or unicast peer to peer traffic signaling data resources 2118 for an Nth traffic interval)). Peer discovery resources 2106 carry peer discovery signals, e.g., signals announcing the presence of a wireless device. Multicast group identification and/or peer to peer connection identifier broadcast resources 2108 convey broadcast signals indicating the presence of a multicast group, the presence of multicast group members, information indicating resources being used by the multicast members, e.g., scheduling resources, information indicating ordering the multicast group, information indicating peer to peer connections, and information indicating resources being used by the peer to peer connections, e.g., scheduling resources.

Each multicast group and/or peer to peer traffic signaling scheduling resources includes a first set of request resources, a second set of request resources and a set of resources for request responses. For example, traffic signaling scheduling resources 2112 includes: first traffic transmission request resources corresponding to the first traffic interval 2120, second traffic transmission request resources corresponding to the first traffic interval 2122, and traffic transmission request response resources corresponding to the first traffic interval 2124. First traffic transmission request resources 2120 occur during first traffic transmission request period 2121, second traffic transmission request resources 2122 occur during second traffic transmission request period 2123, and traffic transmission request response resources 2124 occur during traffic transmission request response period 2125.

Figure 22:
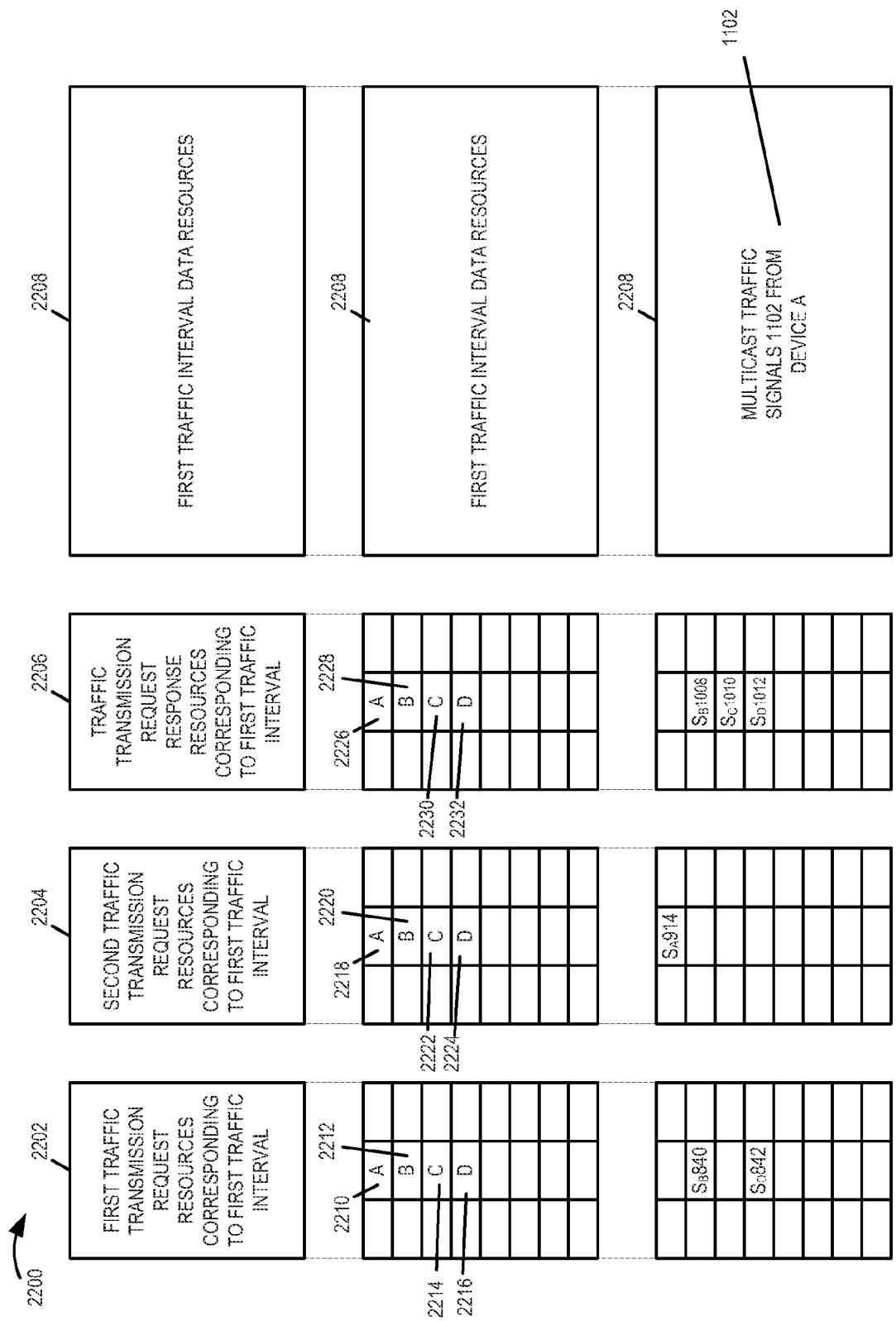
FIG. 22 includes a drawing illustrating exemplary traffic signaling scheduling resources, corresponding first traffic interval data resources, and exemplary signals conveyed in accordance with an exemplary embodiment, e.g., corresponding to the multicast scheduling and multicast traffic data signaling example of FIGS. 8-11.

FIG. 22 includes a drawing 2200 illustrating exemplary traffic signaling scheduling resources (2204, 2206, 2208), corresponding first traffic interval data resources (2208) and exemplary signals conveyed in accordance with an exemplary embodiment. The example of FIG. 22 may correspond to the multicast scheduling and multicast traffic data signaling example of FIG. 8-11.

First traffic transmission request resources corresponding to the first traffic interval 2202 include a plurality of OFDM tone-symbols. OFDM tone-symbols (2210, 2212, 2214, 2216) in first traffic transmission request resources 2202 are associated with multicast group members (A, B, C, D), respectively. There is a priority ordering associated with the position of the OFDM symbols within block 2202. OFDM tone-symbol 2212 carries signal 840 transmitted from device B indicating an intent not to transmit multicast data in first traffic data interval data resources 2208. OFDM tone-symbol 2216 carries signal 842 transmitted from device D indicating an intent not to transmit multicast data in first traffic data interval data resources 2208.

Second traffic transmission request resources corresponding to the first traffic interval 2204 include a plurality of OFDM tone-symbols. OFDM tone-symbols (2218, 2220, 2222, 2224) in second traffic transmission request resources 2204 are associated with multicast group members (A, B, C, D), respectively. OFDM tone-symbol 2218 carries signal 914 transmitted from device A indicating an intent to transmit multicast data in first traffic data interval data resources 2208.

Traffic transmission request response resources corresponding to the first traffic interval 2206 include a plurality of OFDM tone-symbols. OFDM tone-symbols (2226, 2228, 2230, 2232) in traffic transmission request response resources 2206 are associated with multicast group members (A, B, C, D), respectively. OFDM tone-symbol 2228 carries request response signal 1008 transmitted from device B indicating a positive response to request signal 914. OFDM tone-symbol 2230 carries request response signal 1010 transmitted from device C indicating a positive response to request signal 914. OFDM tone-symbol 2232 carries request response signal 1012 transmitted from device D indicating a positive response to request signal 914.

First traffic interval data resources 2208, e.g., a traffic segment, carries multicast traffic signals 1102 transmitted from device A. The multicast signals 1102 are received and recovered by the other members of the multicast group (device B, device C and device D.)

Figure 23:
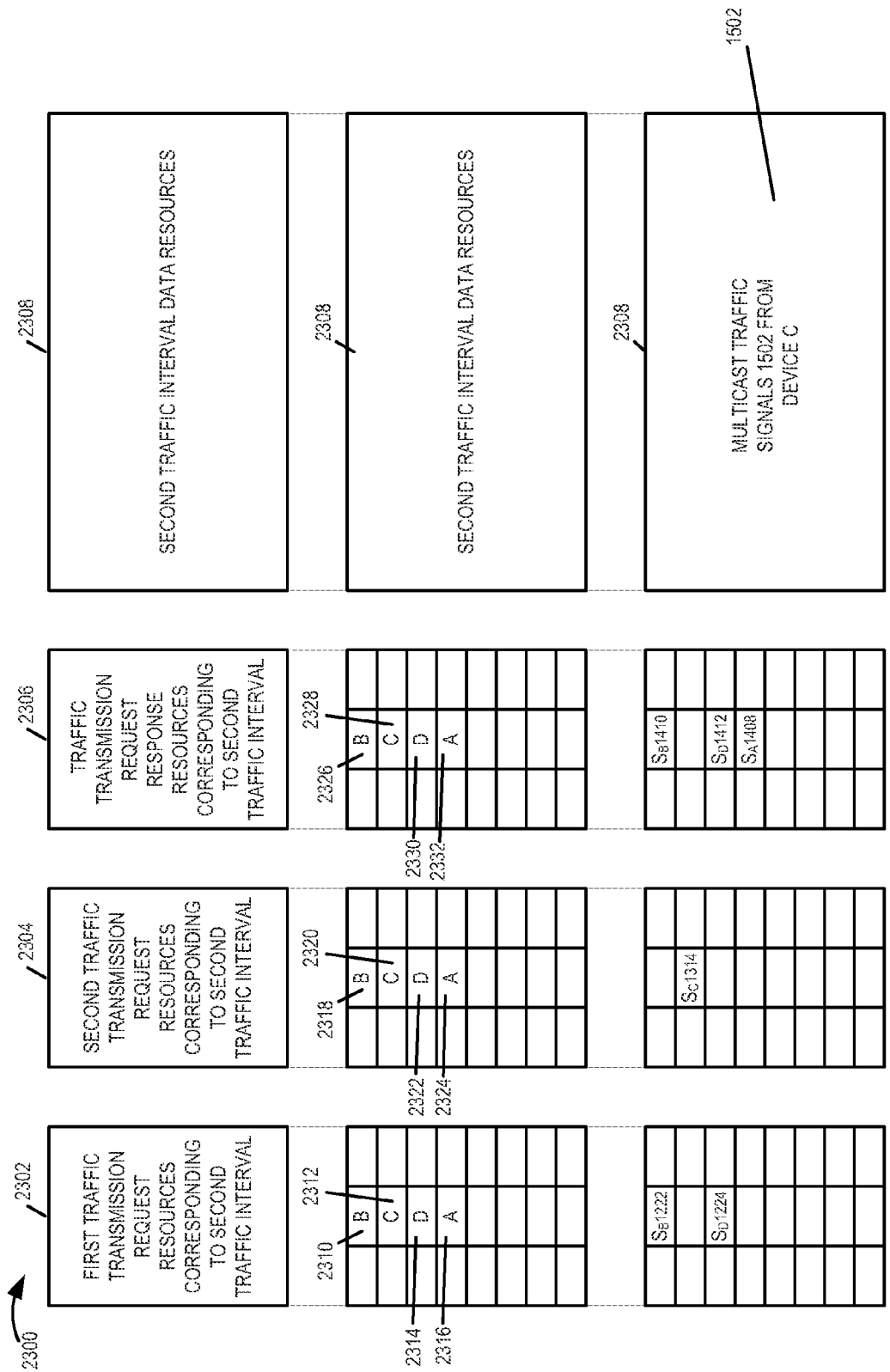
FIG. 23 includes a drawing illustrating exemplary traffic signaling scheduling resources, corresponding second traffic interval data resources, and exemplary signals conveyed in accordance with an exemplary embodiment, e.g., corresponding to the multicast scheduling and multicast traffic data signaling example of FIGS. 12-15.

FIG. 23 includes a drawing 2300 illustrating exemplary traffic signaling scheduling resources (2302, 2304, 2306), corresponding second traffic interval data resources (2308) and exemplary signals conveyed in accordance with an exemplary embodiment. The example of FIG. 23 may correspond to the multicast scheduling and multicast traffic data signaling example of FIG. 12-15.

First traffic transmission request resources corresponding to the second traffic interval 2302 include a plurality of OFDM tone-symbols. OFDM tone-symbols (2310, 2312, 2314, 2316) in first traffic transmission request resources 2302 are associated with multicast group members (B, C, D, A), respectively. There is a priority ordering associated with the position of the OFDM symbols within block 2302. OFDM tone-symbol 2310 carries signal 1222 transmitted from device B indicating an intent not to transmit multicast data in second traffic data interval data resources 2308. OFDM tone-symbol 2314 carries signal 1224 transmitted from device D indicating an intent not to transmit multicast data in second traffic data interval data resources 2308.

Second traffic transmission request resources corresponding to the second traffic interval 2304 include a plurality of OFDM tone-symbols. OFDM tone-symbols (2318, 2320, 2322, 2324) in second traffic transmission request resources 2304 are associated with multicast group members (B, C, D, A), respectively. OFDM tone-symbol 2320 carries signal 1314 transmitted from device C indicating an intent to transmit multicast data in second traffic interval data resources 2308.

Traffic transmission request response resources corresponding to the second traffic interval 2306 include a plurality of OFDM tone-symbols. OFDM tone-symbols (2326, 2328, 2330, 2332) in traffic transmission request response resources 2306 are associated with multicast group members (B, C, D, A), respectively. OFDM tone-symbol 2332 carries request response signal 1408 transmitted from device A indicating a positive response to request signal 1314. OFDM tone-symbol 2326 carries request response signal 1410 transmitted from device B indicating a positive response to request signal 1314. OFDM tone-symbol 2330 carries request response signal 1412 transmitted from device D indicating a positive response to request signal 1314.

Second traffic interval data resources 2308, e.g., a traffic segment, carries multicast traffic signals 1502 transmitted from device C. The multicast signals 1502 are received and recovered by the other members of the multicast group (device A, device B and device D.)

Figure 24:
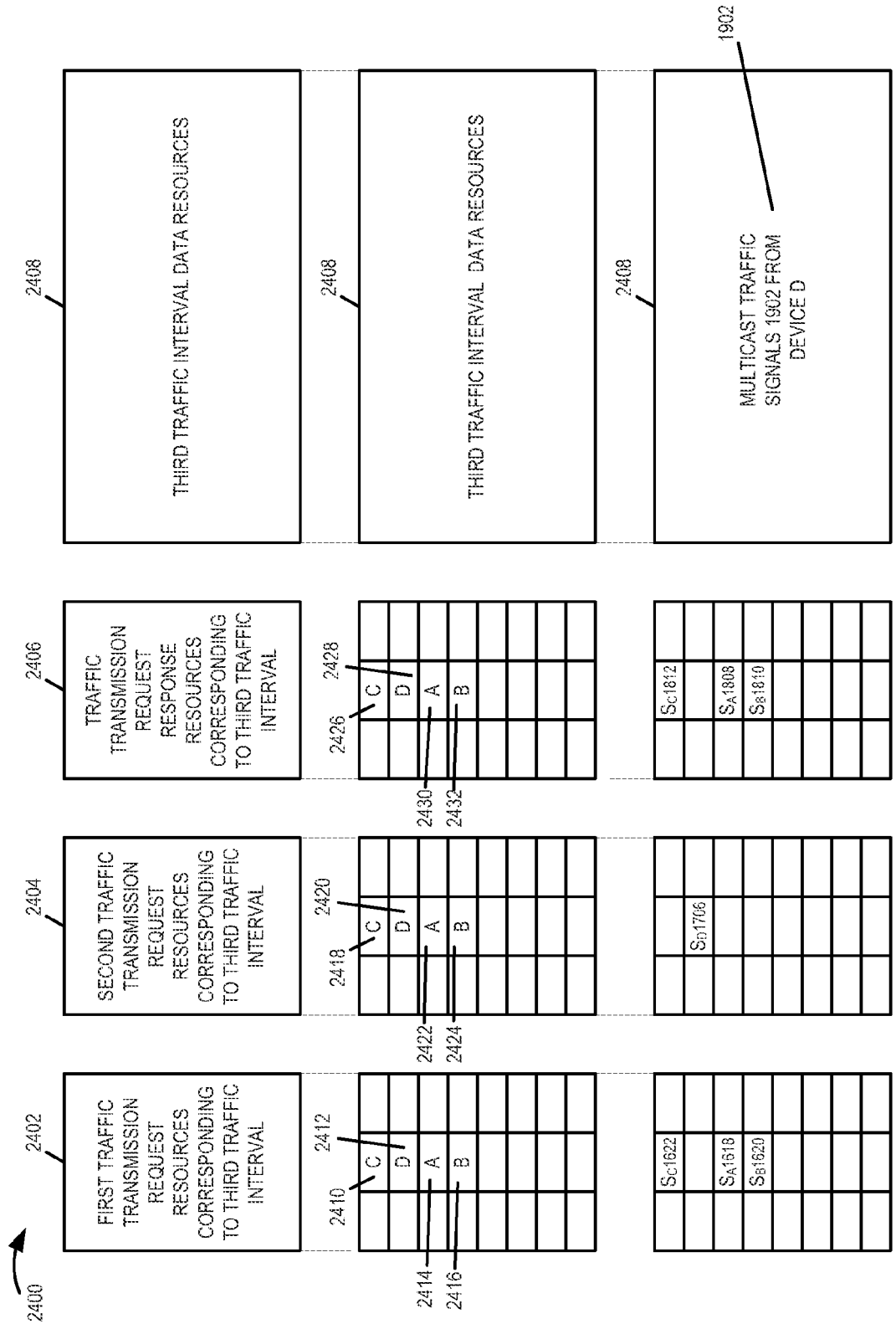
FIG. 24 includes a drawing illustrating exemplary traffic signaling scheduling resources, corresponding third traffic interval data resources, and exemplary signals conveyed in accordance with an exemplary embodiment, e.g., corresponding to the multicast scheduling and multicast traffic data signaling example of FIGS. 16-19.

FIG. 24 includes a drawing 2400 illustrating exemplary traffic signaling scheduling resources (2402, 2404, 2406), corresponding third traffic interval data resources 2408 and exemplary signals conveyed in accordance with an exemplary embodiment. The example of FIG. 24 may correspond to the multicast scheduling and multicast traffic data signaling example of FIG. 16-19.

First traffic transmission request resources corresponding to the third traffic interval 2402 include a plurality of OFDM tone-symbols. OFDM tone-symbols (2410, 2412, 2414, 2416) in first traffic transmission request resources 2402 are associated with multicast group members (C, D, A, B), respectively. There is a priority ordering associated with the position of the OFDM symbols within block 2402. OFDM tone-symbol 2414 carries signal 1618 transmitted from device A indicating an intent not to transmit multicast data in third traffic interval data resources 2408. OFDM tone-symbol 2416 carries signal 1620 transmitted from device B indicating an intent not to transmit multicast data in third traffic data interval data resources 2408. OFDM tone-symbol 2410 carries signal 1622 transmitted from device C indicating an intent not to transmit multicast data in third traffic data interval data resources 2408.

Second traffic transmission request resources corresponding to the third traffic interval 2404 include a plurality of OFDM tone-symbols. OFDM tone-symbols (2418, 2420, 2422, 2424) in second traffic transmission request resources 2404 are associated with multicast group members (C, D, A, B), respectively. OFDM tone-symbol 2420 carries signal 1706 transmitted from device D indicating an intent to transmit multicast data in third traffic data interval data resources 2408.

Traffic transmission request response resources corresponding to the third traffic interval 2406 include a plurality of OFDM tone-symbols. OFDM tone-symbols (2426, 2428, 2430, 2432) in traffic transmission request response resources 2406 are associated with multicast group members (C, D, A, B), respectively. OFDM tone-symbol 2430 carries request response signal 1808 transmitted from device A indicating a positive response to request signal 1706. OFDM tone-symbol 2432 carries request response signal 1810 transmitted from device B indicating a positive response to request signal 1706. OFDM tone-symbol 2426 carries request response signal 1812 transmitted from device C indicating a positive response to request signal 1706.

Third traffic interval data resources 2408, e.g., a traffic segment, carries multicast traffic signals 1902 transmitted from device D. The multicast signals 1902 are received and recovered by the other members of the multicast group (device A, device B, and device C).

Figure 25:
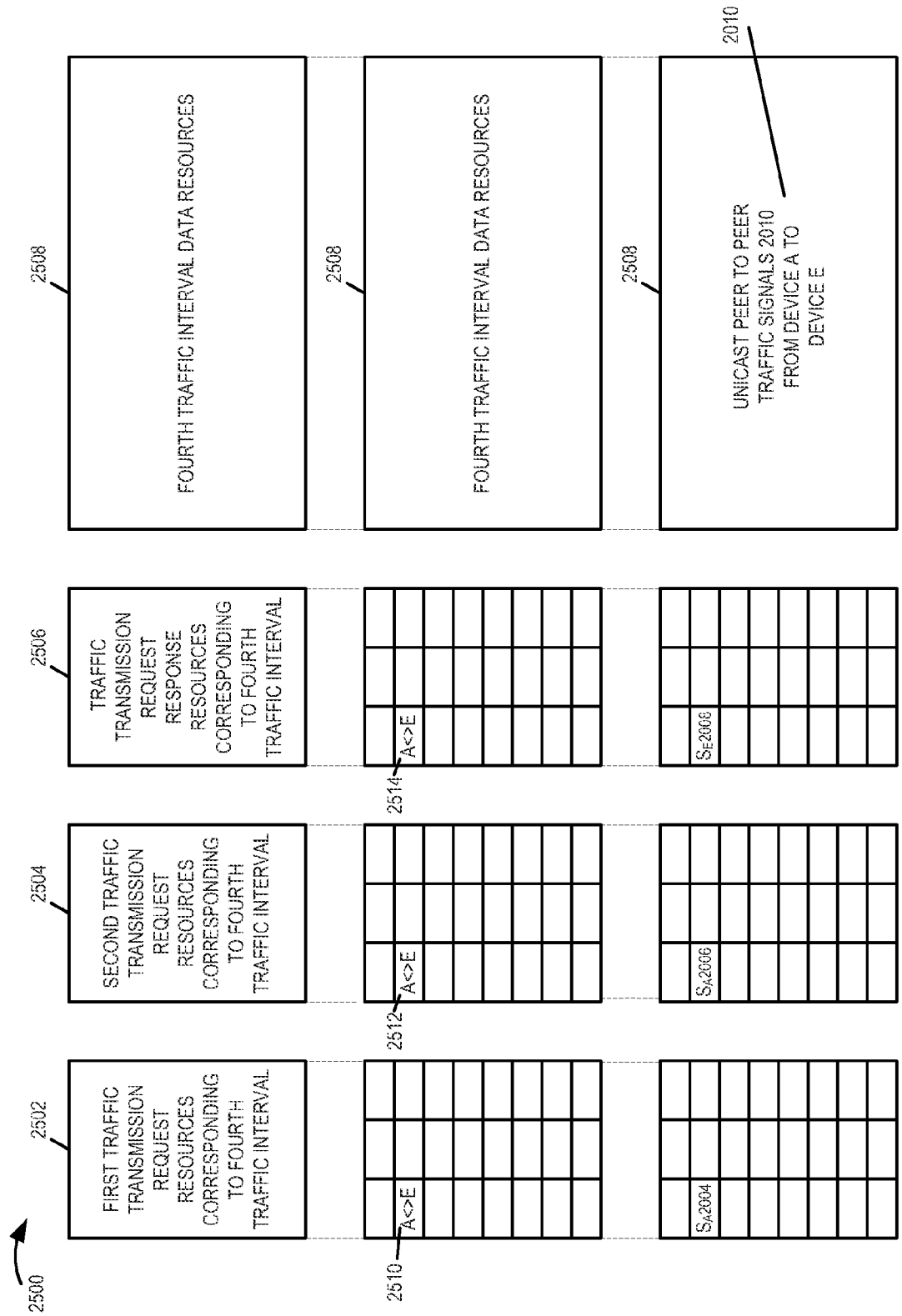
FIG. 25 includes a drawing illustrating exemplary traffic signaling scheduling resources, corresponding fourth traffic interval data resources and exemplary signals conveyed in accordance with an exemplary embodiment, e.g., corresponding to the connection scheduling and unicast peer to peer traffic data signaling example of FIG. 20.

FIG. 25 includes a drawing 2500 illustrating exemplary traffic signaling scheduling resources (2502, 2504, 2506), corresponding fourth traffic interval data resources 2508 and exemplary signals conveyed in accordance with an exemplary embodiment. The example of FIG. 25 may correspond to the connection scheduling and unicast peer to peer traffic data signaling example of FIG. 20.

First traffic transmission request resources corresponding to the fourth traffic interval 2502 include a plurality of OFDM tone-symbols. OFDM tone-symbol 2510 in first traffic transmission request resources 2502 corresponds to peer to peer connection 814 between device A and device E. There is a priority ordering associated with the position of the OFDM symbols within block 2502. OFDM tone-symbol 2510 carries signal 2004 transmitted from device A indicating an intent to transmit unicast peer to peer traffic data to device E in fourth traffic data resources 2508.

Second traffic transmission request resources corresponding to the fourth traffic interval 2504 include a plurality of OFDM tone-symbols. OFDM tone-symbol 2512 carries signal 2006 transmitted from device A indicating an intent to transmit unicast peer to peer traffic data to device E in fourth traffic data resources 2508.

Traffic transmission request response resources corresponding to the fourth traffic interval 2506 include a plurality of OFDM tone-symbols. OFDM tone-symbol 2514 in traffic transmission request response resources 2506 corresponds to peer to peer connection 814 between device A and device E. OFDM tone-symbol 2514 carries request response signal 2008 transmitted from device E indicating a positive response to request signal 2006.

Fourth traffic interval data resources 2508, e.g., a traffic segment, carries unicast peer to peer traffic signals 2010 transmitted from device A to device E. The unicast traffic data signals 2010 are received and recovered by device E.

Various aspects and/or features of some, but not necessarily all, embodiments are described below. Consider an ad hoc network with links includes pairs of devices that want to communicate, e.g., using a peer to peer signaling protocol. As part of traffic scheduling of unicast transmission a device seeking to transmit, in some embodiments, signals its intent or desire to transmit and makes a transmission decision based on whether or not a reply to the signal indicating an intent to transmit is received and/or based on signals from other devices indicating an intent to transmit.

In one exemplary system, e.g., a peer to peer wireless system using OFDM, the system divides time into traffic slots, e.g., equal sized traffic slots. The start of each traffic slot includes a medium access contention phase known as connection scheduling. The links that are successful in connection scheduling communicate in the remainder of the traffic slot.

Figure 26:
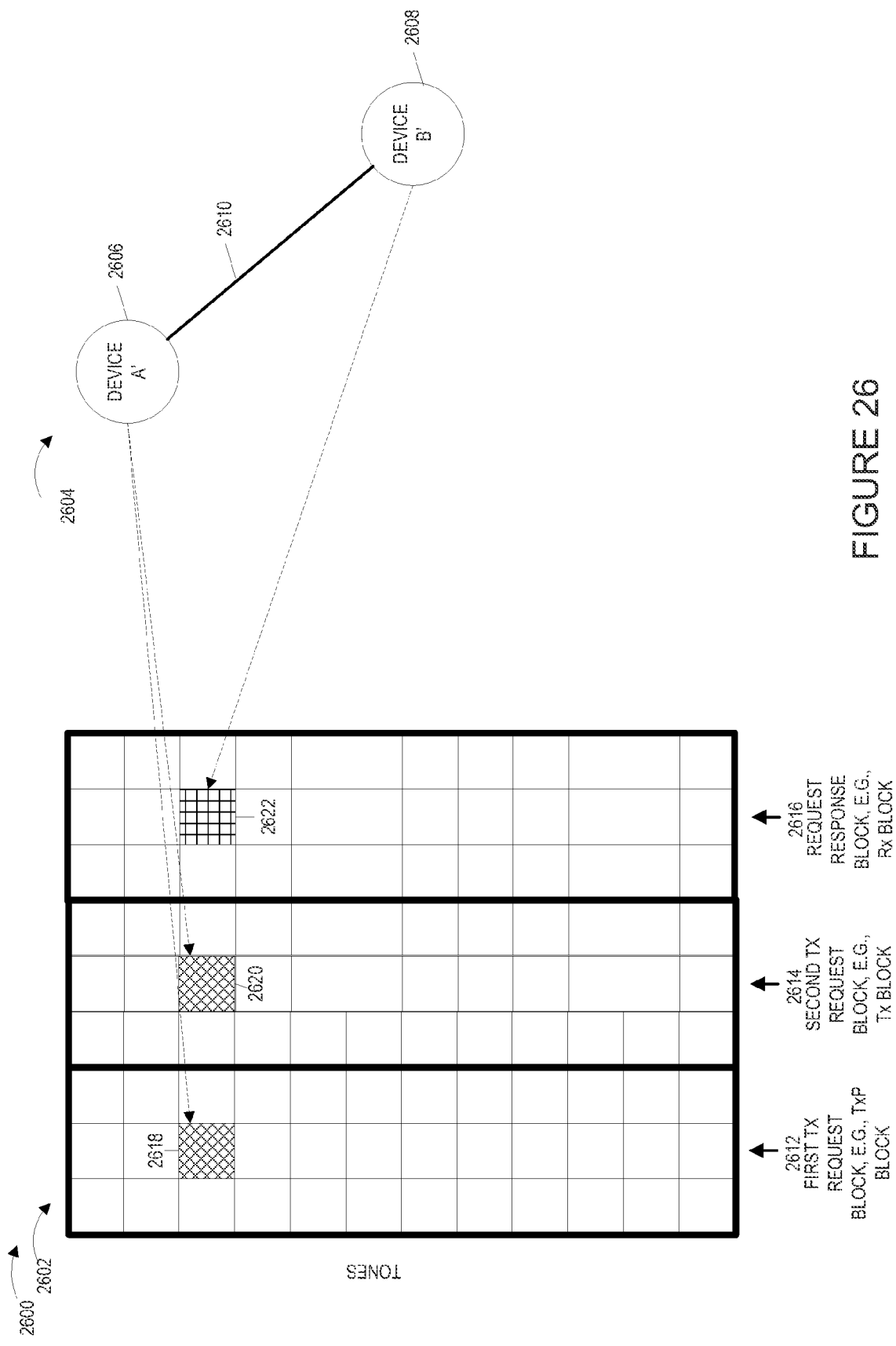
FIG. 26 illustrates an exemplary peer to peer connection, exemplary peer to peer connection unicast traffic scheduling resources and is used to describe an exemplary peer to peer traffic scheduling protocol in accordance with various exemplary embodiments.

Connection scheduling, in some embodiments, includes a first transmission request block, a second transmission request block, and a request response block. The blocks are blocks of air link resources, e.g., frequency, e.g., tone, vs time, e.g., OFDM symbol transmission time. In some such embodiments, the blocks are blocks of OFDM tone-symbols. In some embodiments, the three blocks are of equal size. In one such embodiment, the first transmission request block is referred to as a Tx_P block, the second transmission request block is referred to as a Tx block and the request response block is referred to as a Rx block. Drawing 2600 of FIG. 26 illustrates such an example. Connection scheduling air link resources 2602 includes: a first transmission request block 2612, e.g., a TxP block, a second transmission request block 2614, e.g., a Tx block, and a request response block 2616, e.g., a Rx block. Each competing link in the connection scheduling can transmit on one tone in each of the blocks (2612, 2614, 2616). For example in the drawing 2604 of FIG. 26 the exemplary mobile wireless devices (device A' 2606 and device B' 2608) which form a peer to peer wireless link 2610 can transmit in OFDM tone-symbols 2618, 2620, 2622. The location of the tones that a link can transmit on indicates the priority associated with the link.

The TxP block is used to resolve transmitter and receiver for a link during the traffic slot. In a traffic slot one device of the link will have a transmission priority and if the device has data to transmit it will transmit in TxP to indicate to the other device in the link its intention to transmit. If there is no transmission in TxP the other devices in the link can become the transmitter, assuming it has backlogged data. In FIG. 26 assume that device A' 2606 has the transmission priority then it will transmit in the TxP block 2612 on the tone-symbol 2618 and let device B' 2608 know that it wants to be the transmitter. In the Tx block the now resolved transmitters of each link will transmit on their link's tone. This is illustrated in the FIG. 26 where device A' 2606 again transmits in the Tx block 2614 on tone-symbol 2620. This allows the receiver of the links to get an idea of received power from their own transmitter and the interference they might experience from other links. If a receiver feels it is going to experience too much interference from higher priority links it may decide to not participate in connection scheduling any more. This is known as receive yielding. If a receiver does not receive yield it will reply to its transmitter in the Rx block on the tone associated with link. For example device B' 2608 will transmit on tone-symbol 2622 in Rx block 2616 of FIG. 26. The power of the device B's Rx block reply is inversely proportional to the received power from the transmitter A. The transmitters listen in the Rx block and use the received power on different tones to estimate whether they will cause significant interference to higher priority links or not. If the interference caused is too much, e.g., above a predetermined acceptable threshold level, then they will transmit yield and not communicate with the receiver on the traffic frame. The links that have backlogged data and have neither transmit or receive yielded at the end of connection scheduling can communicate in the traffic slot.

The above described connection protocol is used for unicast communication between two devices, e.g., device A' 2606 and device B' 2608, in accordance with some embodiments. In various embodiments, multicast is enabled in the connection scheduling framework in addition to unicast peer to peer signaling.

In accordance with various embodiments, in a multicast situation, devices of a multicast group signal an intent not to transmit when they do not intend to transmit. The member of the multicast group having the highest priority and which did not transmit a signal indicating an intent NOT to transmit then transmits using the communications resource. Thus, in accordance with various aspects multicast transmission scheduling is implemented by devices affirmatively indicating an intent NOT to transmit and the remaining devices than making a decision as to which one should transmit based on the device's relative priority.

Figure 27:
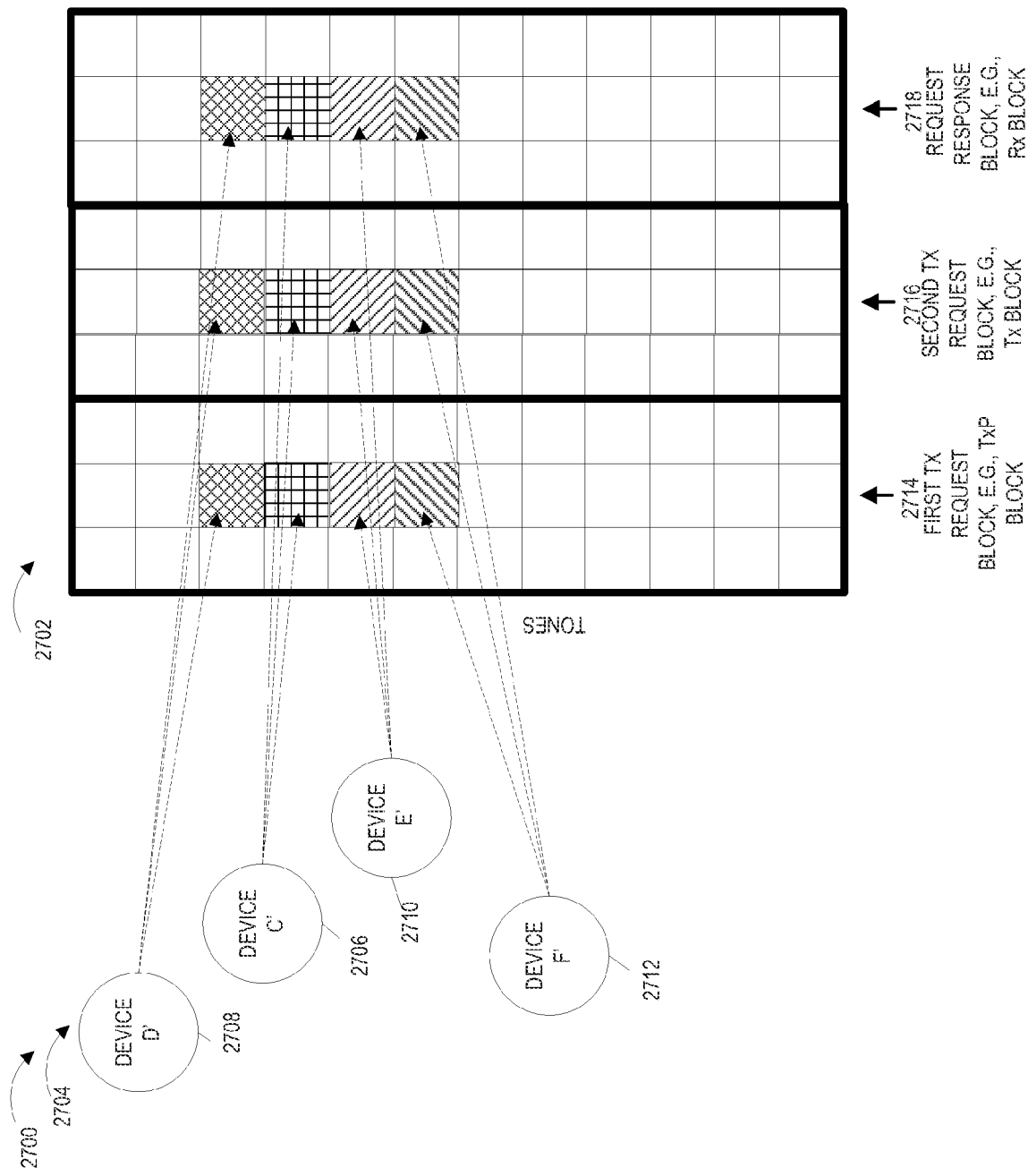
FIG. 27 illustrates an exemplary multicast group, exemplary multicast group traffic scheduling resources and is used to describe an exemplary multicast traffic scheduling protocol in accordance with various exemplary embodiments.

Multicast includes a group of devices one of which is a transmitter and the rest are receivers. In FIG. 27, mobile wireless devices, device C' 2706, device D' 2708, device E' 2710 and device F' 2712, form a multicast group 2704. In some embodiments, as part of enabling multicast, one tone is allocated in connection scheduling on a per device basis instead of on a link basis, e.g., each device in the multicast group is assigned one tone-symbol in each of the three blocks. This is illustrated in the example of FIG. 27. FIG. 27 illustrates exemplary scheduling air link resource 2702 including a first transmission request block 2714, e.g., a TxP block, a second transmission request block 2716, e.g., a Tx block, and a request response block 2718, e.g., a Rx block. The multicast group 2704 includes device C' 2706, device D' 2708, device E' 2710, and device F' 2712. Device D' 2708 is allocated the three tone-symbols shown with diagonal crosshatch shading. Device C' 2706 is allocated the three tone-symbols shown with vertical and horizontal crosshatch shading. Device E' 2710 is allocated the three tone-symbols shown with diagonal shading with the lines descending from left to right. Device F' 2712 is allocated the three tone-symbols shown with diagonal line shading with the lines ascending from left to right.

Each device in the multicast group is assigned a tone in each of the three blocks in connection scheduling. At a given traffic frame each device in the group has a transmission priority within the group. The tone location of a device indicates the transmission priority of the device within the group. In FIG. 27 device D' 2708 has the highest transmission priority followed by devices C' 2706, E' 2710 and F' 2712. The device with the highest transmission priority that has multicast traffic becomes the transmitter and the rest should become receivers. In the first request block, the TxP block, each device in a group transmits on their tone if they are willing to receive, rather than transmit, in the traffic frame. The devices that want to transmit listen to these transmissions and are able to recognize which devices want to be transmitter and which devices are willing to be receiver in the group for the traffic slot. Additionally using the location of the tones associated with devices each potential transmitter device can determine whether it is has the highest transmission priority among potential transmitters in the group or not. In FIG. 27 consider that device C' 2706 and device E' 2710 want to be transmitters, but device D' 2708 and device F' 2712 do not want to transmit multicast traffic data in the traffic slot. Device D' 2708 and device F' 2712 transmit in the TxP block 2714, indicting their intent not to transmit traffic. Device E' 2710 which has been monitoring the transmissions, recognizes that it does not have the highest transmission priority. If a device has the highest transmission priority it will become the transmitter of the group and will transmit in the Tx block 2716 on its own tone. In the example, device C' 2706 becomes the transmitter of the group and transmit on its tone in the Tx block 2716. The rest of the devices in the group (device D' 2708, device E' 2710, and device F' 2712) listen to the transmitter of the group in the Tx block 2716 and make a decision on whether to receive yield or not. The receive yielding as, in the case described above with a peer to peer connection is based on interference receiver from higher priority links. If they do not receive yield then they reply to the transmitter in the Rx block 2718 on their own tones. In the example consider that devices D' 2708, E' 2710 and F' 2712 do not receiver yield and reply to device C' in Rx block 2718. The power scaling of the Rx block 2718 replies, in some embodiments, will inversely scale with the received power from the transmitter in the group. Based on the replies received in the Rx block the transmitter, e.g., device C' 2706, may decide to transmit yield or not.

Various described methods and apparatus are well suited for use in a wireless communications system supporting both peer to peer connection scheduling and multicast scheduling. In various embodiments, both multicast and unicast links can, and do, coexist in harmony. In some embodiments, peer to peer connections and multicast groups can, and sometimes do, use the same connection scheduling resources blocks, e.g., when deciding whether or not to transmit in a traffic resource. Different portions of the blocks may be allocated for unicast and multicast. In some embodiments, at different times different percentages of the scheduling resources may be allocated to peer to peer unicast scheduling and to multicast scheduling, e.g., in response to the needs of the wireless communications network at a particular location and a particular time. For example, in some embodiments, peer to peer connections and multicast groups dynamically self allocate themselves traffic scheduling resources from among the available traffic scheduling resources, e.g., as part of peer to peer connection establishment and/or multicast group establishment. At one time a particular set of traffic scheduling resources, e.g., three OFDM tone-symbols which includes one tone-symbol in each of a first request resource block, a second request resource block and a request response resource block, may be allocated to a peer to peer connection, and at a different time the set of traffic scheduling resources may be allocated to a member of multicast group for multicast group singaling. The use of the allocated resources and type of signals which are conveyed depend on whether the resource is allocated to a peer to peer connection of to a multicast group member.

In various embodiments, a first wireless device may be transmitting multicast traffic data to members of its multicast group using a first traffic segment, while a second wireless device may be transmitting unicast traffic data to a third wireless device, using the same first traffic segment, e.g., provided the scheduling has determined that the concurrent scheduling is permissible, e.g., in accordance with priority information and/or interference estimation information, e.g., transmitter yielding decisions and receiver yielding decisions allowing the transmission to proceed.

In various embodiments, during a first traffic transmission request block, e.g., a TxP block, a device that is part of a unicast link which is interested in a transmission request signal transmission of its pair or lack thereof during the first traffic transmission request block can operate and is not adversely impacted by the inclusion of multicast scheduling signaling on other resources of the first transmission request block indicating an intent not to transmit. The peer to peer connection devices look at their own allocated resources within the first traffic transmission request block and interpret the signaling in accordance with the peer to peer unicast traffic scheduling protocol. The multicast group member devices look at their allocated resources within the first traffic transmission request block and interpret the signaling in accordance with the multicast traffic scheduling protocol. In the second traffic transmission request block, e.g., the Tx block, both a device having a peer to peer connection which intends to transmit traffic and a multicast group device which intends to transmit traffic transmit a traffic transmission request signal. In the traffic transmission request response block intended receivers, e.g., intended unicast traffic receivers and intended multicast traffic receiver, transmit request response signals when they decide not to perform receiver yielding. The intended transmitters, both unicast and multicast, can, and in some embodiments, do use received request response signals to make transmitter yielding decisions.

Various methods and apparatus described in this application are well suited for use in wireless communications devices and networks supporting peer to peer signaling. In various embodiments a device of any of one or more of FIGS. 1-27 includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the wireless communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., mobile wireless communications devices, e.g., mobile nodes such as mobile terminals, stationary wireless communications devices such as access points such as base stations, network nodes and/or communications systems. Various embodiments are also directed to methods, e.g., method of controlling and/or operating wireless communications devices such as mobile nodes and/or stationary nodes, access points such as base stations network nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal reception, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a wireless communications device supporting peer to peer signaling, including a processor configured to implement one, multiple or all of the steps of one or more methods of the invention.

In some embodiments, the processor or processors, e.g., CPUs, of one or more devices, e.g., communications nodes such as wireless terminals, access nodes, and/or network nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless device which is a member of a multicast group, the method comprising:
    monitoring for signals from other members of the multicast group indicating an intent not to transmit during a first traffic interval;
    making a transmission decision with regard to the first traffic interval based on a priority level of the wireless device relative to other members of the multicast group, from which a signal indicating an intent not to transmit was not received; and
    transmitting a signal indicating an intent not to transmit in a second traffic interval when said wireless device does not have data to transmit to the multicast group during the second traffic interval.

2. The method of claim 1, wherein making a transmission decision includes:

making a decision to transmit when the priority level of the wireless device is higher than the priority level of devices in the multicast group for which the monitoring did not detect a signal indicating an intent not to transmit.

3. The method of claim 1, wherein making a transmission decision includes:

making a decision not to transmit when the priority level of the wireless device is lower than the priority level of another device in the multicast group for which the monitoring did not detect a signal indicating an intent not to transmit.

4. The method of claim 1, further comprising:

maintaining a list of group members based on group membership information signals received by the wireless device; and for a traffic interval, storing information indicating the members of the group from which a signal indicating an intent not to transmit was received.

5. The method of 1, further comprising:

when the wireless device has unicast traffic to transmit, transmitting a unicast indicator signal indicating an intent to transmit.

6. A wireless device which is a member of a multicast group, the wireless device comprising:

means for monitoring for signals from other members of the multicast group indicating an intent not to transmit during a first traffic interval; and means for making a transmission decision with regard to the first traffic interval based on a priority level of the wireless device relative to other members of the multicast group, from which a signal indicating an intent not to transmit was not received; and means for transmitting a signal indicating an intent not to transmit in a second traffic interval when said wireless device does not have data to transmit to the multicast group during the second traffic interval.

7. The wireless device of claim 6, wherein the means for making a transmission decision includes:

means for making a decision to transmit when the priority level of the wireless device is higher than the priority level of devices in the multicast group for which the monitoring did not detect a signal indicating an intent not to transmit.

8. The wireless device of claim 6, wherein means for making a transmission decision includes:

means for making a decision not to transmit when the priority level of the wireless device is lower than the priority level of another device in the multicast group for which the monitoring did not detect a signal indicating an intent not to transmit.

9. The wireless device of claim 6, further comprising:

means for maintaining a list of group members based on group membership information signals received by the wireless device; and means for storing information indicating the members of the group from which a signal indicating an intent not to transmit was received, for a traffic interval.

10. The wireless device of claim 6, further comprising:

means for transmitting a unicast indicator signal indicating an intent to transmit, when the wireless device has unicast traffic to transmit.

11. A computer program product for use in a wireless device which is a member of a multicast group, the computer program product comprising:

a non-transitory computer readable medium comprising:

code for causing at least one computer to monitor for signals from other members of the multicast group indicating an intent not to transmit during a first traffic interval;

code for causing the at least one processor to make a transmission decision with regard to the first traffic interval based on a priority level of the wireless device relative to other members of the multicast group, from which a signal indicating an intent not to transmit was received; and code for causing at least one transmitter to transmit a signal indicating an intent not to transmit in a second traffic interval when said wireless device does not have data to transmit to the multicast group during the second traffic interval.

12. The computer program product of claim 11, wherein the non-transitory computer readable medium comprises:

code for causing the at least one processor to make a decision to transmit when the priority level of the wireless device is higher than the priority level of devices in the multicast group for which the monitoring did not detect a signal indicating an intent not to transmit, as part of the code for causing the at least one processor to make a transmission decision.

13. A wireless device which is a member of a multicast group, the wireless device comprising:

at least one processor configured to:

monitor for signals from other members of the multicast group indicating an intent not to transmit during a first traffic interval;

make a transmission decision with regard to the first traffic interval based on a priority level of the wireless device relative to other members of the multicast group, from which a signal indicating an intent not to transmit was not received; and transmit a signal indicating an intent not to transmit in a second traffic interval when the wireless device does not have data to transmit to the multicast group during the second traffic interval; and memory coupled to the at least one processor.

14. The wireless device of claim 13, wherein the at least one processor is configured to make a decision to transmit when the priority level of the wireless device is higher than the priority level of devices in the multicast group for which the monitoring did not detect a signal indicating an intent not to transmit, as part of being configured to make a transmission decision.

15. The wireless device of claim 13, wherein the at least one processor is configured to make a decision not to transmit when the priority level of the wireless device is lower than the priority level of another device in the multicast group for which the monitoring did not detect a signal indicating an intent not to transmit, as part of being configured to make a transmission decision.

16. The wireless device of claim 13, wherein the at least one processor is further configured to:

maintain a list of group members based on group membership information signals received by the wireless device; and store information indicating the members of the group from which a signal indicating an intent not to transmit was received, for a traffic interval.

17. The wireless device of claim 13, wherein the at least one processor is further configured to:

transmit a unicast indicator signal indicating an intent to transmit, when the wireless device has unicast traffic to transmit.

18. The method of claim 1 wherein the monitoring is performed during a first traffic request period corresponding to the first traffic interval; and when the transmission decision is a decision to transmit, the method further comprising:
transmitting a second signal during a second traffic request period corresponding to the first traffic interval indicating an intent to transmit data during the first traffic interval.

19. The method of claim 18, further comprising:
monitoring for transmission request responses corresponding to the second signal from members of the multicast group.

20. The method of claim 19, wherein there is a predetermined known relationship between the transmission resource used to transmit the second signal and transmission resources which may be used to transmit the responses.

* * * * *